United States Patent
Suzuki et al.

(10) Patent No.: US 10,421,338 B2
(45) Date of Patent: Sep. 24, 2019

(54) VEHICLE AIR-CONDITIONING DEVICE

(71) Applicant: SANDEN HOLDINGS CORPORATION, Isesaki-shi, Gunma (JP)

(72) Inventors: Kenichi Suzuki, Isesaki (JP); Ryo Miyakoshi, Isesaki (JP); Kouhei Yamashita, Isesaki (JP)

(73) Assignee: SANDEN HOLDINGS CORPORATION, Isesaki-shi, Gunma (JP)

( * ) Notice: Subject to any disclaimer, the term of this patent is extended or adjusted under 35 U.S.C. 154(b) by 283 days.

(21) Appl. No.: 15/515,085

(22) PCT Filed: Sep. 18, 2015

(86) PCT No.: PCT/JP2015/076666
§ 371 (c)(1),
(2) Date: Mar. 28, 2017

(87) PCT Pub. No.: WO2016/059945
PCT Pub. Date: Apr. 21, 2016

(65) Prior Publication Data
US 2017/0225542 A1     Aug. 10, 2017

(30) Foreign Application Priority Data
Sep. 29, 2014    (JP) .................................. 2014-198597

(51) Int. Cl.
*B60H 1/00*     (2006.01)
*B60H 1/22*     (2006.01)
(Continued)

(52) U.S. Cl.
CPC ....... *B60H 1/00921* (2013.01); *B60H 1/2221* (2013.01); *F25B 5/02* (2013.01);
(Continued)

(58) Field of Classification Search
CPC ............ B60H 1/00921; B60H 1/00278; B60H 1/2221; B60H 2001/00949;
(Continued)

(56) References Cited

U.S. PATENT DOCUMENTS

| 8,733,126 | B2 * | 5/2014 | Sekiya | ............... | B60H 1/00278 165/42 |
| 2011/0113800 | A1 * | 5/2011 | Sekiya | ............... | B60H 1/00278 62/151 |

(Continued)

FOREIGN PATENT DOCUMENTS

| CN | 103502030 A | 1/2014 |
| JP | 09-086149 A | 3/1997 |

(Continued)

OTHER PUBLICATIONS

The State Intellectual Property Office of The People's Republic of China, The First Office Action issued in Chinese Application No. CN 201580052386.3 dated Nov. 2, 2018.

(Continued)

*Primary Examiner* — David D Hwu
(74) *Attorney, Agent, or Firm* — Baker Botts L.L.P.

(57) ABSTRACT

There is disclosed a vehicle air-conditioning device in which a refrigerant subcool degree in a radiator is appropriately controlled, so that comfortable and efficient vehicle interior air conditioning is achievable. The vehicle air-conditioning device executes a heating mode in which a controller lets a refrigerant discharged from a compressor 2 radiate heat in a radiator 4, decompresses the refrigerant by which heat has been radiated by an outdoor expansion valve 6, and then lets the refrigerant absorb heat in an outdoor heat exchanger 7. In the heating mode, the vehicle air-conditioning device controls a refrigerant subcool degree SC of the radiator 4 by the outdoor expansion valve 6. On a basis of a radiator inlet air temperature THin that is a temperature of the air flowing (Continued)

into the radiator 4, the controller corrects a target subcool degree TGSC that is a target value of the refrigerant subcool degree SC in the radiator 4 in a lowering direction, as the radiator inlet air temperature THin rises.

1 Claim, 27 Drawing Sheets

(51) Int. Cl.
*F25B 5/02* (2006.01)
*F25B 6/04* (2006.01)
*F25B 49/02* (2006.01)
*F25B 40/00* (2006.01)
*F25B 40/02* (2006.01)
*B60H 1/32* (2006.01)

(52) U.S. Cl.
CPC ............... *F25B 6/04* (2013.01); *F25B 49/02* (2013.01); *B60H 2001/00949* (2013.01); *B60H 2001/00957* (2013.01); *B60H 2001/3257* (2013.01); *B60H 2001/3258* (2013.01); *B60H 2001/3272* (2013.01); *B60H 2001/3285* (2013.01); *B60H 2001/3288* (2013.01); *F25B 40/00* (2013.01); *F25B 40/02* (2013.01); *F25B 2400/0409* (2013.01); *F25B 2500/19* (2013.01); *F25B 2600/2513* (2013.01); *F25B 2700/171* (2013.01); *F25B 2700/2106* (2013.01); *F25B 2700/21151* (2013.01); *F25B 2700/21161* (2013.01); *F25B 2700/21163* (2013.01)

(58) Field of Classification Search
CPC .. B60H 2001/00957; B60H 2001/3257; B60H 2001/3258; B60H 2001/3272; B60H 2001/3285; B60H 2001/3288; F25B 5/02; F25B 6/04; F25B 49/02; F25B 40/00; F25B 40/02; F25B 2400/0409; F25B 2500/19; F25B 2600/2513; F25B 2700/171; F25B 2700/2106; F25B 2700/21151; F25B 2700/21161; F25B 2700/21163

See application file for complete search history.

(56) References Cited

U.S. PATENT DOCUMENTS

| | | | |
|---|---|---|---|
| 2014/0033761 A1* | 2/2014 | Kawakami | B60H 1/00278 62/498 |
| 2015/0040594 A1 | 2/2015 | Suzuki et al. | |
| 2015/0059380 A1 | 3/2015 | Takayama et al. | |

FOREIGN PATENT DOCUMENTS

| | | |
|---|---|---|
| JP | 3985384 B2 | 7/2007 |
| JP | 2009-243881 A | 10/2009 |
| JP | 2010-249452 A | 11/2010 |
| JP | 2013-068407 A | 4/2013 |
| JP | 2013-144996 A1 | 10/2013 |
| JP | 2013-542130 A | 11/2013 |
| WO | 2012/108240 A1 | 8/2012 |
| WO | 2012/118198 A1 | 9/2012 |

OTHER PUBLICATIONS

Japan Patent Office, Notification of Reasons for Refusal issued in Japanese Patent Application No. 2014-198597, dated May 29, 2018.
Japan Patent Office; International Search Report issued in International Application No. PCT/JP2015/076666, dated Dec. 22, 2015.

* cited by examiner

VEHICLE AIR-CONDITIONING DEVICE

CROSS-REFERENCE TO RELATED APPLICATIONS

This application is a U.S. National Stage Patent Application under 37 U.S.C. § 371 of International Patent Application No. PCT/JP2015/076666, filed on Sep. 18, 2015, which claims the benefit of Japanese Patent Application No. JP 2014-198597, filed on Sep. 29, 2014, the disclosures of each of which are incorporated herein by reference in their entirety.

TECHNICAL FIELD

The present invention relates to an air-conditioning device of a heat pump system which conditions air in a vehicle interior, and more particularly, it relates to a vehicle air-conditioning device which is applicable to a hybrid car or an electric car.

BACKGROUND ART

Due to actualization of environmental problems in recent years, hybrid cars and electric cars have spread. Further, as an air-conditioning device which is applicable to such a vehicle, there has been developed an air-conditioning device which includes a compressor to compress and discharge a refrigerant, a radiator (a condenser) disposed in a vehicle interior air flow passage to let the refrigerant radiate heat, a heat absorber (an evaporator) disposed in the vehicle interior air flow passage to let the refrigerant absorb heat, and an outdoor heat exchanger disposed outside a vehicle interior to let the refrigerant absorb heat, and which lets the refrigerant discharged from the compressor radiate heat in the radiator, decompresses the refrigerant by which heat has been radiated by an outdoor expansion valve, and then lets the refrigerant absorb heat in the outdoor heat exchanger to heat air to be supplied from an indoor blower (a blower fan), thereby heating the vehicle interior (e.g., see Patent Document 1).

Furthermore, in Patent Document 1, there is provided a constitution where a heater core (auxiliary heating means) through which engine cooling water (warm water) circulates is disposed in the vehicle interior air flow passage, and in addition to the heating by the radiator, the heater core also exerts a heating capability. It is to be noted that there is also a case of driving an engine for power generation in the hybrid car, but also in this case, the engine cooling water (the warm water) circulates through the heater core.

CITATION LIST

Patent Document

Patent Document 1: Japanese Patent Publication No. 3985384

SUMMARY OF THE INVENTION

Problems to be Solved by the Invention

In a case where such auxiliary heating means is disposed in a vehicle interior air flow passage, a compressor of an air-conditioning device is driven when a heating capability runs short only with heating of this auxiliary heating means, but the auxiliary heating means raises a temperature of air flowing into a radiator.

On the other hand, in the radiator, the refrigerant is cooled by heat exchange with the air in the air flow passage, and hence the refrigerant is subcooled on an outlet side of the radiator. Then, a refrigerant subcool degree is usually controlled by an outdoor expansion valve in accordance with an air volume of the air flowing into the radiator so that the degree increases when the air volume is large and the degree decreases when the air volume is small, but when the temperature of the air flowing into the radiator rises due to the above-mentioned heating by the auxiliary heating means, the subcool degree of the refrigerant is not adjusted in the radiator. When a target subcool degree remains to be high in such a situation, unevenness of the temperature is generated depending on a portion of the radiator, the temperature varies with an air outlet position into a vehicle interior, and for these reasons and the like, conformity deteriorates. There has been the problem that the deterioration similarly occurs when the refrigerant subcool degree of the radiator is high also in a situation where an outdoor air temperature lowers and a refrigerant flow rate decreases.

Furthermore, when a difference between a targeted temperature of the radiator and the temperature of the air flowing into the radiator is eliminated by the heating of the auxiliary heating means, a required heating capability of the vehicle air-conditioning device decreases, and hence the refrigerant flow rate also decreases. Therefore, as compared with a case where the heating is not performed by the auxiliary heating means, there has been the problem that setting of a valve position of the outdoor expansion valve is not matched as it is, and power consumption increases.

The present invention has been developed to solve such a conventional technical problem, and an object thereof is to provide a vehicle air-conditioning device in which a refrigerant subcool degree in a radiator is appropriately controlled, so that comfortable and efficient vehicle interior air conditioning is achievable.

Means for Solving the Problems

To achieve the above object, a vehicle air-conditioning device of the invention of claim 1 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and the vehicle air-conditioning device is characterized in that on the basis of a radiator inlet air temperature THin that is the temperature of the air flowing into the radiator, the control means corrects a target subcool degree TGSC that is a target value of the refrigerant subcool degree SC in the radiator in a lowering direction, as the radiator inlet air temperature THin rises.

The vehicle air-conditioning device of the invention of claim 2 is characterized in that in the above invention, the control means fixes a valve position of the outdoor expansion valve to a predetermined position in a case where the radiator inlet air temperature THin is not less than a predetermined value.

The vehicle air-conditioning device of the invention of claim 3 is characterized in that in the above respective inventions, the control means corrects a target number of revolution TGNC that is a target value of a number of revolution NC of the compressor in a decreasing direction, as the radiator inlet air temperature THin rises.

A vehicle air-conditioning device of the invention of claim 4 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and the vehicle air-conditioning device is characterized in that on the basis of an outdoor air temperature Tam, the control means corrects a target subcool degree TGSC of the radiator in a lowering direction, as the outdoor air temperature Tam lowers.

A vehicle air-conditioning device of the invention of claim 5 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and the vehicle air-conditioning device is characterized in that on the basis of a number of revolution NC of the compressor, the control means corrects a target subcool degree TGSC that is a target value of the refrigerant subcool degree SC in the radiator in a lowering direction, as the number of revolution NC decreases.

A vehicle air-conditioning device of the invention of claim 6 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and the vehicle air-conditioning device is characterized in that on the basis of a refrigerant suction temperature Ts of the compressor, the control means corrects a target subcool degree TGSC that is a target value of the refrigerant subcool degree SC of the radiator in a lowering direction, as the refrigerant suction temperature Ts lowers.

A vehicle air-conditioning device of the invention of claim 7 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and the vehicle air-conditioning device is characterized in that on the basis of a difference (TCO−THin) between a radiator target temperature TCO that is a target value of a temperature of the radiator and a radiator inlet air temperature THin that is a temperature of the air flowing into the radiator, the control means corrects a target subcool degree TGSC that is a target value of the refrigerant subcool degree SC of the radiator in a lowering direction, as the difference (TCO−THin) decreases.

The vehicle air-conditioning device of the invention of claim 8 is characterized in that in the above invention, the control means corrects a target number of revolution TGNC that is a target value of a number of revolution NC of the compressor in a decreasing direction, as the difference (TCO−THin) between the radiator target temperature TCO and the radiator inlet air temperature THin decreases.

A vehicle air-conditioning device of the invention of claim 9 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and the vehicle air-conditioning device is characterized in that on the basis of a radiator inlet air temperature THin that is a temperature of the air flowing into the radiator, the control means corrects a minimum valve position of the outdoor expansion valve in a lowering direction, as the radiator inlet air temperature THin rises.

A vehicle air-conditioning device of the invention of claim 10 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and the vehicle air-conditioning device is characterized in that on the basis of a difference (TCO−THin) between a radiator target temperature TCO that is a target value of a temperature of the radiator and a radiator inlet air temperature THin that is a temperature of the air flowing into the radiator, the control means corrects a minimum valve position of the outdoor expansion valve in a lowering direction, as this difference (TCO−THin) decreases.

A vehicle air-conditioning device of the invention of claim 11 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and the vehicle air-conditioning device is characterized in that on the basis of an outdoor air temperature Tam, the control means corrects a minimum valve position of the outdoor expansion valve in a lowering direction, as the outdoor air temperature Tam lowers.

A vehicle air-conditioning device of the invention of claim 12 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and the vehicle air-conditioning device is characterized in that on the basis of a number of revolution NC of the compressor, the control means corrects a minimum valve position of the outdoor expansion valve in a lowering direction, as the number of revolution NC decreases.

A vehicle air-conditioning device of the invention of claim 13 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and the vehicle air-conditioning device is characterized in that on the basis of a refrigerant suction temperature Ts of the compressor, the control means corrects a minimum valve position of the outdoor expansion valve in a lowering direction, as the refrigerant suction temperature Ts lowers.

Advantageous Effect of the Invention

According to the invention of claim 1, a vehicle air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and in the vehicle air-conditioning device, on the basis of a radiator inlet air temperature THin that is a temperature of the air flowing into the radiator, the control means corrects a target subcool degree TGSC that is a target value of the refrigerant subcool degree SC in the radiator in a lowering direction, as the radiator inlet air temperature THin rises. Therefore, when the radiator inlet air temperature THin rises due to the heating by the auxiliary heating means, it is possible to eliminate radiator temperature unevenness generated because the refrigerant subcool degree SC of the radiator is high, and comfortable vehicle interior air conditioning is achievable.

Here, when the radiator inlet air temperature THin rises to a predetermined value or more due to the heating of the auxiliary heating means, it is substantially not possible to control the refrigerant subcool degree SC of the radiator by the outdoor expansion valve. However, as in the invention of claim 2, the control means fixes a valve position of the outdoor expansion valve to a predetermined position in a case where the radiator inlet air temperature THin is not less than the predetermined value, so that it is possible to eliminate the disadvantage that the control of the outdoor expansion valve falls in an unintended situation.

Furthermore, when the radiator inlet air temperature THin rises due to the heating by the auxiliary heating means, a temperature of the air to be blown out to the vehicle interior noticeably varies in accordance with an operation situation of the compressor. However, as in the invention of claim 3, the control means corrects a target number of revolution TGNC that is a target value of a number of revolution NC of the compressor in a decreasing direction, as the radiator inlet air temperature THin rises. Consequently, it is possible to inhibit such temperature variation.

According to the invention of claim 4, a vehicle air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and in the vehicle air-conditioning device, on the basis of an outdoor air temperature Tam, the control means corrects a target subcool degree TGSC of the radiator in a lowering direction, as the outdoor air temperature Tam lowers. Consequently, when a refrigerant flow rate decreases due to drop of the outdoor air temperature Tam, it is possible to eliminate radiator temperature unevenness generated because the refrigerant subcool degree SC of the radiator is high, and comfortable vehicle interior air conditioning is achievable.

According to the invention of claim 5, a vehicle air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and in the vehicle air-conditioning device, on the basis of a number of revolution NC of the compressor, the control means corrects a target subcool degree TGSC that is a target value of the refrigerant subcool degree SC in the radiator in a lowering direction, as the number of revolution NC decreases. Consequently, when a refrigerant flow rate decreases due to the decrease of the number of revolution NC of the compressor, it is possible to eliminate radiator temperature unevenness generated because the refrigerant subcool degree SC of the radiator is high, and comfortable vehicle interior air conditioning is achievable.

According to the invention of claim 6, a vehicle air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and in the vehicle air-conditioning device, on the basis of a refrigerant suction temperature Ts of the compressor, the control means corrects a target subcool degree TGSC that is a target value of the refrigerant subcool degree SC of the radiator in a lowering direction, as the refrigerant suction temperature Ts lowers. Consequently, in a situation where the refrigerant suction temperature Ts of the compressor lowers and a number of revolution of the compressor also decreases to decrease a refrigerant flow rate, it is possible to eliminate radiator temperature unevenness generated because the refrigerant subcool degree SC of the radiator is high, and comfortable vehicle interior air conditioning is achievable.

According to the invention of claim 7, a vehicle air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and in the vehicle air-conditioning device, on the basis of a difference (TCO−THin) between a radiator target temperature TCO that is a target value of a temperature of the radiator and a radiator inlet air temperature THin that is a temperature of the air flowing into the radiator, the control means corrects a target subcool degree TGSC that is a target value of the refrigerant subcool degree SC of the radiator in a lowering direction, as the difference (TCO−THin) decreases. Consequently, when the radiator inlet air temperature THin rises due to the heating by the auxiliary heating means and the difference (TCO−THin) decreases, it is possible to eliminate radiator temperature unevenness generated because the refrigerant subcool degree SC of the radiator is high, and comfortable vehicle interior air conditioning is achievable.

Furthermore, when the radiator inlet air temperature THin rises due to the heating of the auxiliary heating means and the difference (TCO−THin) decreases, a temperature of the air to be blown out to the vehicle interior noticeably varies in accordance with an operation situation of the compressor. However, as in the invention of claim 8, the control means corrects a target number of revolution TGNC that is a target value of a number of revolution NC of the compressor in a decreasing direction, as the difference (TCO−THin) between the radiator target temperature TCO and the radiator inlet air temperature THin decreases. Consequently, it is possible to inhibit such temperature variation.

Furthermore, according to the invention of claim 9, a vehicle air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and in the vehicle air-conditioning device, on the basis of a radiator inlet air temperature THin that is a temperature of the air flowing into the radiator, the control means corrects a minimum valve position of the outdoor expansion valve in a lowering direction, as the radiator inlet air temperature THin rises. Therefore, in a situation where the radiator inlet air temperature THin rises due to the heating of the auxiliary heating means and the refrigerant flow rate decreases, the minimum valve position of the outdoor expansion valve lowers, so that the setting of the valve position of the outdoor expansion valve can match such a situation. Consequently, decrease of power consumption is achievable.

According to the invention of claim 10, a vehicle air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and in the vehicle air-conditioning device, on the basis of a difference (TCO−THin) between a radiator target temperature TCO that is a target value of a temperature of the radiator and a radiator inlet air temperature THin that is a temperature of the air flowing into the radiator, the control means corrects a minimum valve position of the outdoor expansion valve in a lowering direction, as this difference (TCO−THin) decreases.

Therefore, in a situation where the radiator inlet air temperature THin rises due to the heating of the auxiliary heating means and the difference (TCO−THin) decreases to decrease a refrigerant flow rate, the minimum valve position of the outdoor expansion valve lowers, so that the setting of the valve position of the outdoor expansion valve can match such a situation. Consequently, decrease of power consumption is achievable.

According to the invention of claim 11, a vehicle air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and in the vehicle air-conditioning device, on the basis of an outdoor air temperature Tam, the control means corrects a minimum valve position of the outdoor expansion valve in a lowering direction, as the outdoor air temperature Tam lowers. Therefore, in a situation where the refrigerant flow rate decreases due to the drop of the outdoor air temperature Tam, the minimum valve position of the outdoor expansion valve lowers, so that the setting of the valve position of the outdoor expansion valve can match such a situation. Consequently, decrease of power consumption is achievable.

According to the invention of claim 12, a vehicle air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and in the vehicle air-conditioning device, on the basis of a number of revolution NC of the compressor, the control means corrects a minimum valve position of the outdoor expansion valve in a lowering direction, as the number of revolution NC decreases. Therefore, in a situation where the number of revolution NC decreases to decrease a refrigerant flow rate, the minimum valve position of the outdoor expansion valve lowers, so that the setting of the valve position of the outdoor expansion valve can match such a situation. Consequently, decrease of power consumption is achievable.

According to the invention of claim 13, a vehicle air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant absorb heat, an outdoor expansion valve which decompresses the refrigerant flowing into this outdoor heat exchanger, auxiliary heating means for heating the air to be supplied from the air flow passage to the vehicle interior, and control means, the vehicle air-conditioning device executes at least a heating mode in which this control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in this heating mode, the vehicle air-conditioning device controls a refrigerant subcool degree SC of the radiator by the outdoor expansion valve, and in the vehicle air-conditioning device, on the basis of a refrigerant suction temperature Ts of the compressor, the control means corrects a minimum valve position of the outdoor expansion valve in a lowering direction, as the refrigerant suction temperature Ts lowers. Therefore, in a situation where the refrigerant suction temperature Ts of the compressor lowers and the number of revolution of the compressor also decreases to decrease a refrigerant flow rate, the minimum valve position of the outdoor expansion valve lowers, so that the setting of the valve position of the outdoor expansion valve can match such a situation. Consequently, decrease of power consumption is achievable.

MODE FOR CARRYING OUT THE INVENTION

Hereinafter, embodiments of the present invention will be described in detail with reference to the drawings.

Embodiment 1

Figure 1:
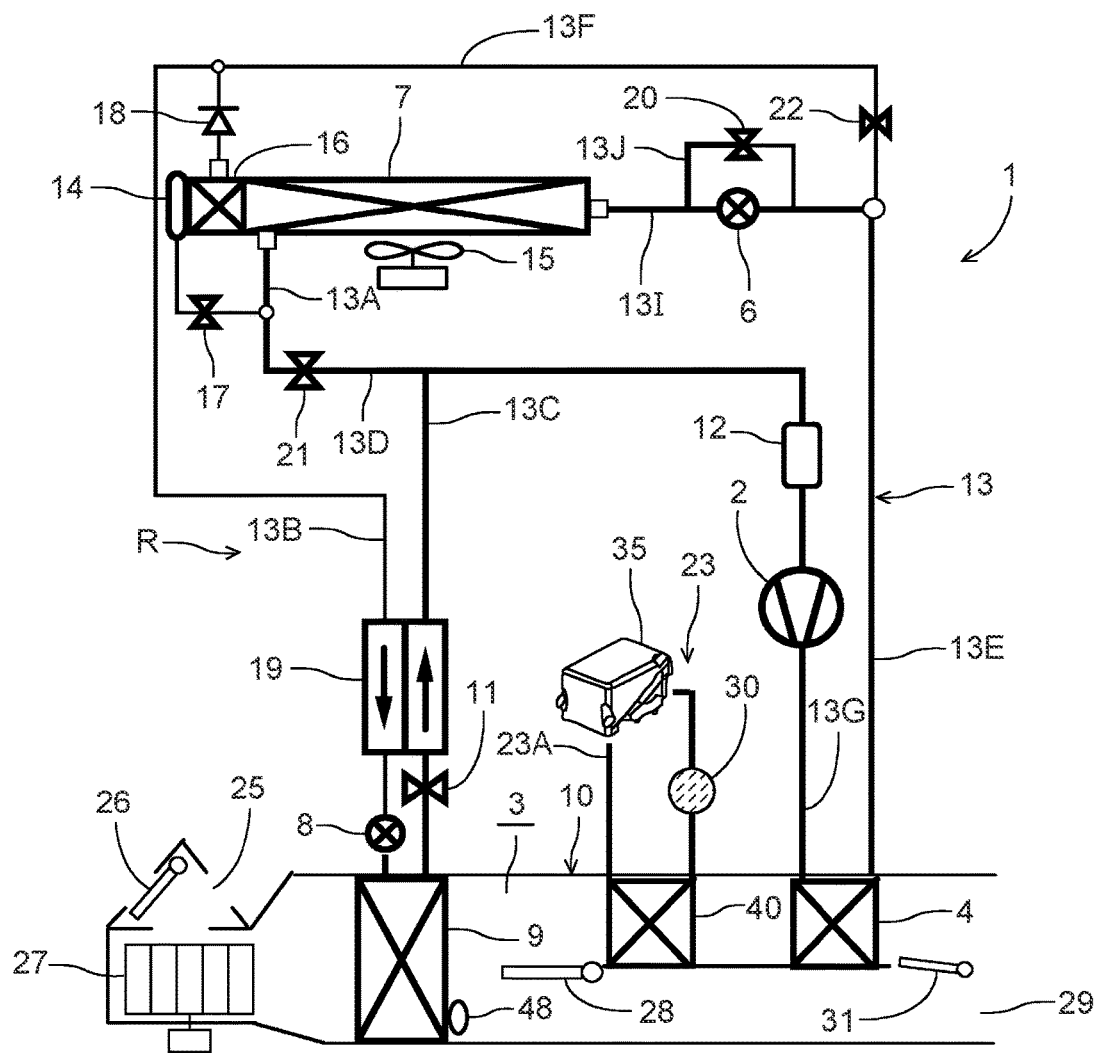
FIG. 1 is a constitutional view of a vehicle air-conditioning device of one embodiment to which the present invention is applied.

FIG. 1 shows a constitutional view of one embodiment of a vehicle air-conditioning device 1 to which the present invention is applied. A vehicle of the embodiment to which the present invention is applied is an electric car (EV) in which an engine (an internal combustion engine) is not mounted and which runs by driving an electric motor for running with power charged in a battery (which is not shown in the drawing), and the vehicle air-conditioning device 1 of the present invention is also driven with the power of the battery. That is, the vehicle air-conditioning device 1 of the embodiment performs heating by a heat pump operation using a refrigerant circuit in the electric car in which it is not possible to perform heating by engine waste heat, and further, the vehicle air-conditioning device selectively executes respective operation modes of dehumidifying and heating, dehumidifying and cooling, cooling and the like.

It is to be noted that the vehicle is not limited to the electric car, and the present invention is also effective for a so-called hybrid car using the engine together with the electric motor for running, and furthermore, needless to say, the present invention is also applicable to a usual car which runs with the engine.

The vehicle air-conditioning device 1 of the embodiment performs air conditioning (heating, cooling, dehumidifying, and ventilation) of a vehicle interior of the electric car, and there are successively connected, by a refrigerant pipe 13, an electric type of compressor 2 which compresses a refrigerant, a radiator 4 disposed in an air flow passage 3 of an HVAC unit 10 in which vehicle interior air passes and circulates, to let the high-temperature high-pressure refrigerant discharged from the compressor 2 flow inside via a refrigerant pipe 13G and to let this refrigerant radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, thereby constituting a refrigerant circuit R.

It is to be noted that in the outdoor heat exchanger 7, an outdoor blower 15 is disposed. The outdoor blower 15 is constituted to forcibly blow the outdoor air through the outdoor heat exchanger 7, thereby performing heat exchange between the outdoor air and the refrigerant, and consequently, the outdoor blower blows the outdoor air through the outdoor heat exchanger 7 also during stop (i.e., a velocity VSP is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve (an opening/closing valve) 21 to be opened during the heating. Furthermore, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve (an opening/closing valve) 22 to be opened during the dehumidifying.

Furthermore, the outdoor expansion valve 6 is connected in parallel with a bypass pipe 13J, and in the bypass pipe 13J, a solenoid valve (an opening/closing valve) 20 is interposed to open in a cooling mode so that the refrigerant bypasses the outdoor expansion valve 6 to flow. It is to be noted that a pipe between the outdoor expansion valve 6 and the solenoid valve 20 and the outdoor heat exchanger 7 is denoted with 131.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode), and further to adjust a ratio (an indoor/outdoor air ratio). Furthermore, on an air downstream side of the suction changing damper 26, an indoor blower (a blower fan) 27 is disposed to supply the introduced indoor air or outdoor air to the air flow passage 3.

Furthermore, in FIG. 1, reference numeral 23 indicates a heating medium circulating circuit as auxiliary heating means disposed in the vehicle air-conditioning device 1 of the embodiment. The heating medium circulating circuit 23 includes a circulating pump 30 constituting circulating means, a heating medium heating electric heater 35, and a heating medium-air heat exchanger 40 disposed in the air flow passage 3 on an air upstream side (an air inflow side) of the radiator 4 to the flow of the air of the air flow passage 3, and these components are successively annularly connected to one another by a heating medium pipe 23A. It is to be noted that as the heating medium to circulate in the heating medium circulating circuit 23, for example, water, a refrigerant such as HFO-1234yf, a coolant or the like is employed.

Then, when the circulating pump 30 is operated and the heating medium heating electric heater 35 is energized to generate heat (when the heating medium circulating circuit 23 operates), the heating medium heated by the heating medium heating electric heater 35 circulates through the heating medium-air heat exchanger 40. That is, the heating medium-air heat exchanger 40 of the heating medium circulating circuit 23 becomes a so-called heater core, and heats the air in the air flow passage 3 flowing into the radiator 4, to complement the heating of the vehicle interior. Furthermore, the employing of the heating medium circulating circuit 23 can improve electric safety of a passenger.

Furthermore, in the air flow passage 3 on the air upstream side of the heating medium-air heat exchanger 40 and the radiator 4, an air mix damper 28 is disposed to adjust a ratio at which indoor air or outdoor air is to be passed through the radiator 4. Furthermore, in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute change control of blowing of the air from each outlet mentioned above.

Figure 2:
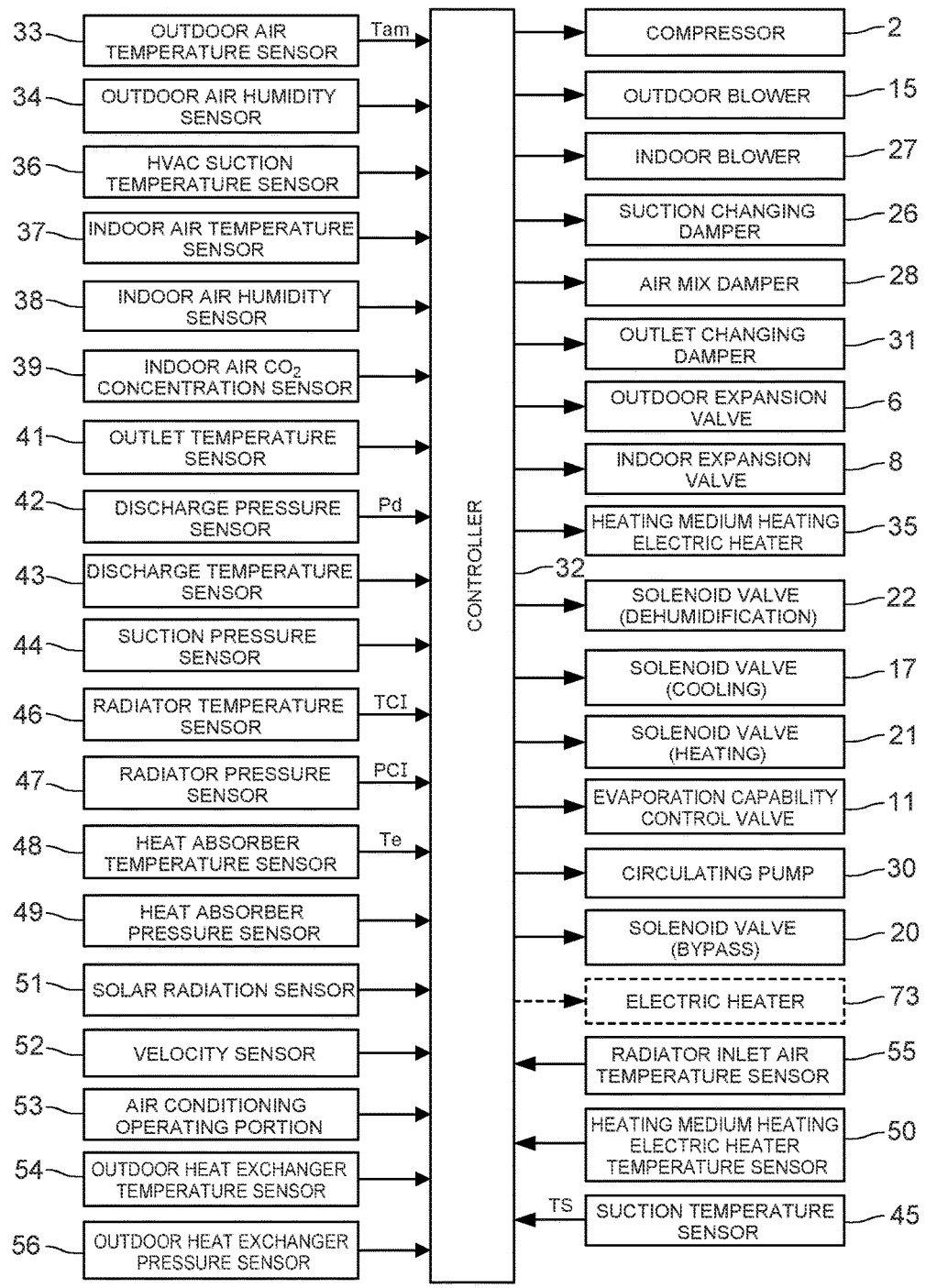
FIG. 2 is a block diagram of an electric circuit of a controller of the vehicle air-conditioning device of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature Tam of the vehicle, an outdoor air humidity sensor 34 which detects an outdoor air humidity of the vehicle, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a suction temperature sensor 45 which detects a refrigerant suction temperature Ts of the compressor 2, a radiator temperature sensor 46 which detects a temperature of the radiator 4 (the temperature of the air passed through the radiator 4 or the temperature of the radiator 4 itself, i.e., a radiator temperature TCI), a radiator pressure sensor 47 which detects a refrigerant pressure of the radiator 4 (the pressure in the radiator 4 or of the refrigerant which has just flowed out from the radiator 4, i.e., a radiator pressure PCI), a heat absorber temperature sensor 48 which detects a temperature of the heat absorber 9 (the temperature of the air passed through the heat absorber 9 or the temperature of the heat absorber 9 itself, i.e., a heat absorber temperature Te), a heat absorber pressure sensor 49 which detects a refrigerant pressure of the heat absorber 9 (the pressure in the heat absorber 9 or of the refrigerant which has just flowed out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), i.e., a refrigerant evaporation temperature of the outdoor heat exchanger 7, and an outdoor heat exchanger pressure sensor 56 which detects the refrigerant pressure of the outdoor heat exchanger 7 (the pressure in the outdoor heat exchanger 7 or of the refrigerant which has just flowed out from the outdoor heat exchanger 7).

Furthermore, the input of the controller 32 is further connected to respective outputs of a heating medium heating electric heater temperature sensor 50 which detects a temperature of the heating medium heating electric heater 35 of the heating medium circulating circuit 23 (the temperature of the heating medium which has just been heated by the heating medium heating electric heater 35, or the temperature of an unshown electric heater itself disposed in the heating medium heating electric heater 35), and a radiator inlet air temperature sensor 55 which detects a temperature of the air flowing through the heating medium-air heat exchanger 40 into the radiator 4 (a radiator inlet air temperature THin).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, respective solenoid valves 22, 17, 21 and 20, the circulating pump 30, the heating medium heating electric heater 35, and the evaporation capability control valve 11. Further, the controller 32 controls these components on the basis of the outputs of the respective sensors and the setting input by the air conditioning operating portion 53.

Next, an operation of the vehicle air-conditioning device 1 of the embodiment having the above-mentioned constitution will be described. In the embodiment, the controller 32 changes and executes respective operation modes roughly divided into a heating mode, a dehumidifying and heating mode, an internal cycle mode, a dehumidifying and cooling mode, and a cooling mode. First, a flow of the refrigerant in each operation mode will be described.

(1) Heating Mode

When the heating mode is selected by the controller 32 or a manual operation to the air conditioning operating portion 53, the controller 32 opens the solenoid valve 21 and closes the solenoid valve 17, the solenoid valve 22 and the solenoid valve 20. Then, the controller operates the compressor 2 and the respective blowers 15 and 27, and the air mix damper 28 has a state of passing the air blown out from the indoor blower 27 through the heating medium-air heat exchanger 40 and the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. It is to be noted that an operation and a function of the heating medium circulating circuit 23 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump and the outdoor heat exchanger 7 functions as an evaporator of the refrigerant. Then, the low-temperature refrigerant flowing out from the outdoor heat exchanger 7 flows through the refrigerant pipe 13A and the solenoid valve 21 and the refrigerant pipe 13D, and flows from the refrigerant pipe 13C into the accumulator 12 to perform gas liquid separation therein, and then the gas refrigerant is sucked into the compressor 2, thereby repeating this circulation. The air heated through the heating medium-air heat exchanger 40 flows into the radiator 4 to be heated and is then blown out from the outlet 29, thereby performing the heating of the vehicle interior.

The controller 32 controls a number of revolution NC of the compressor 2 on the basis of a refrigerant pressure of the radiator which is detected by the radiator pressure sensor 47, i.e., the radiator pressure PCI (a high pressure of the refrigerant circuit R), also controls a valve position of the outdoor expansion valve 6 on the basis of a subcool degree SC of the refrigerant which is calculated on the basis of a temperature (the radiator temperature TCI) of the radiator 4 which is detected by the radiator temperature sensor 46 and the radiator pressure PCI, and controls the subcool degree SC of the refrigerant in an outlet of the radiator 4.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior. The controller 32 controls the number of revolution of the compressor 2 on the basis of the radiator pressure PCI detected by the radiator pressure sensor 47, and also controls the valve position of the outdoor expansion valve 6 on the basis of the temperature of the heat absorber 9 which is detected by the heat absorber temperature sensor 48.

(3) Internal Cycle Mode

Next, in the internal cycle mode, the controller 32 shuts off the outdoor expansion valve 6 in the above state of the dehumidifying and heating mode (a shut off position), and also closes the solenoid valves 20 and 21. When the outdoor expansion valve 6 and the solenoid valves 20 and 21 close, inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but a heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution of the compressor 2 on the basis of the temperature of the heat absorber 9 or the radiator pressure PCI described above. At this time, the controller 32 selects a smaller compressor target number of revolution from compressor target numbers of revolution obtainable by calculations from the temperature of the heat absorber 9 or the radiator pressure PCI, to control the compressor 2.

(4) Dehumidifying and Cooling Mode

Next, in the dehumidifying and cooling mode, the controller 32 opens the solenoid valve 17 and closes the solenoid valve 21, the solenoid valve 22 and the solenoid valve 20. Then, the controller operates the compressor 2 and the respective blowers 15 and 27, and the air mix damper 28 has the state of passing the air blown out from the indoor blower 27 through the heating medium-air heat exchanger 40 and the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior. The controller 32 controls the number of revolution of the compressor 2 on the basis of the temperature of the heat absorber 9 which is detected by the heat absorber temperature sensor 48, and also controls the valve position of the outdoor expansion valve 6 on the basis of the above-mentioned radiator pressure PCI.

(5) Cooling Mode

Next, in the cooling mode, the controller 32 opens the solenoid valve 20 in the above state of the dehumidifying and cooling mode (in this case, the outdoor expansion valve 6 may have any valve position including full open (the valve position is an upper limit of controlling)), and the air mix damper 28 has a state where the air does not pass through the heating medium-air heat exchanger 40 and the radiator 4. However, the air may slightly pass. In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the solenoid valve 20 and the outdoor expansion valve 6.

At this time, the solenoid valve 20 is open, and hence the refrigerant bypasses the outdoor expansion valve 6 to pass the bypass pipe 13J, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 to the vehicle interior, thereby performing cooling of the vehicle interior. In this cooling mode, the controller 32 controls the number of revolution of the compressor 2 on the basis of the temperature of the heat absorber 9 which is detected by the heat absorber temperature sensor 48.

(6) Auxiliary Heating by Heating Medium Circulating Circuit (Auxiliary Heating Means) in Heating Mode Furthermore, in a case where the controller 32 judges that the heating capability by the radiator 4 runs short in the above-mentioned heating mode, the controller energizes the heating medium heating electric heater 35 to generate heat, and operates the circulating pump 30, thereby executing heating by the heating medium circulating circuit 23.

When the circulating pump 30 of the heating medium circulating circuit 23 operates and the heating medium heating electric heater 35 energizes, the heating medium (a high-temperature heating medium) heated by the heating medium heating electric heater 35 as described above circulates through the heating medium-air heat exchanger 40, and hence the air in the air flow passage 3 flowing into the radiator 4 heats.

(7) Control Block of Compressor and Outdoor Expansion Valve in Heating Mode

Figure 3:
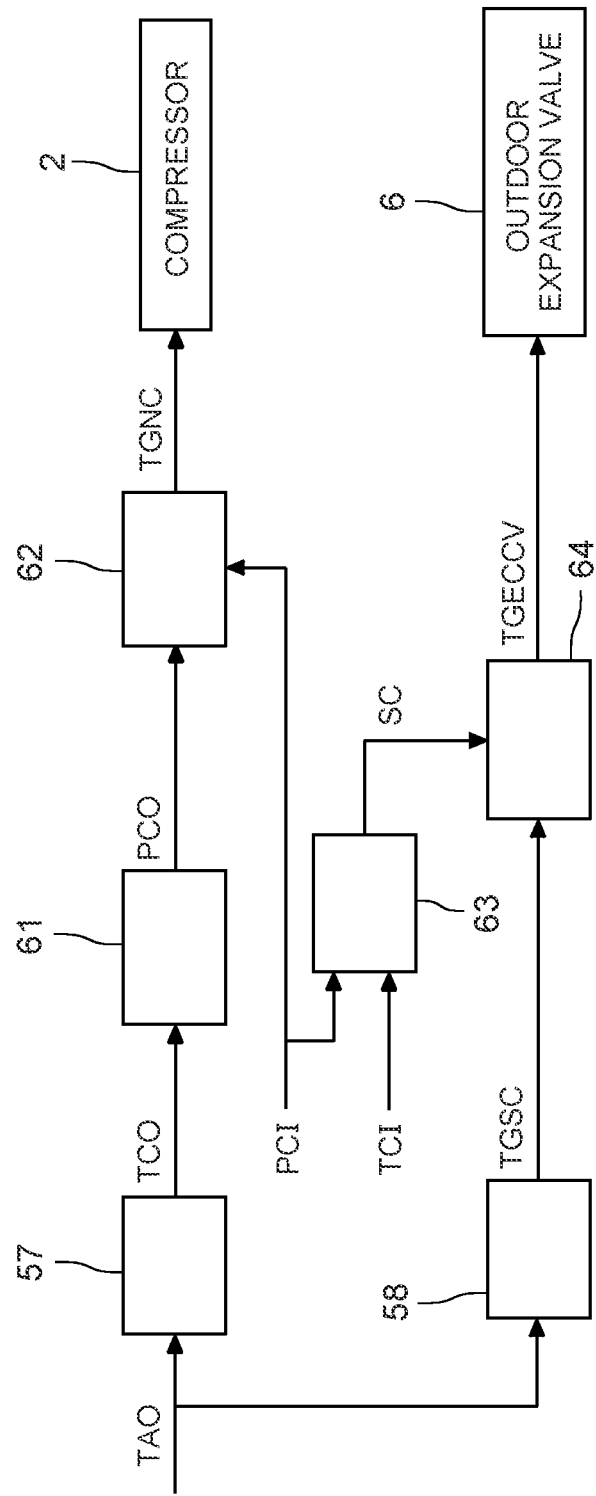
FIG. 3 is a control block diagram of a controller of FIG. 2.

FIG. 3 shows a control block diagram of the compressor 2 and the outdoor expansion valve 6 by the controller 32 in the above heating mode. The controller 32 inputs a target outlet temperature TAO into a radiator target temperature calculation section 57 and a radiator target subcool degree calculation section 58. The target outlet temperature TAO is a target value of the temperature of the air blown out from the outlet 29 to the vehicle interior, and is calculated from Equation (1) mentioned below by the controller 32.

$$TAO = (Tset - Tin) \times K + Tbal(f(Tset, SUN, Tam)) \quad (I),$$

in which Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and an outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes.

The controller 32 calculates a radiator target temperature TCO from the target outlet temperature TAO in the radiator target temperature calculation section 57, and next calculates a radiator target pressure PCO on the basis of the radiator target temperature TCO in a radiator target pressure calculation section 61. Then, on the basis of the radiator target pressure PCO and the pressure (the radiator pressure PCI) of the radiator 4 which is detected by the radiator pressure sensor 47, the controller 32 calculates a target number of revolution TGNC that is a target value of the number of revolution NC of the compressor 2 in a compressor revolution number calculation section 62, and operates the compressor 2 at the target number of revolution TGNC. That is, the controller 32 controls the radiator pressure PCI in accordance with the number of revolution NC of the compressor 2.

Furthermore, the controller 32 calculates a target subcool degree TGSC that is a target value of the subcool degree SC of the refrigerant in the radiator 4 on the basis of the target outlet temperature TAO in the radiator target subcool degree calculation section 58. On the other hand, the controller 32 calculates the subcool degree SC of the refrigerant in the radiator 4 on the basis of the radiator pressure PCI and the temperature of the radiator 4 (the radiator temperature TCI) which is detected by the radiator temperature sensor 46 in a radiator subcool degree calculation section 63. Then, on the basis of the subcool degree SC and the target subcool degree TGSC, the controller calculates a target valve position (a target outdoor expansion valve position TGECCV) of the outdoor expansion valve 6 in a target outdoor expansion valve position calculation section 64. Then, the controller 32 controls the valve position of the outdoor expansion valve 6 into the target outdoor expansion valve position TGECCV.

(8-1) Control of Target Subcool Degree TGSC of Radiator 4 (Embodiment 1)

Here, the radiator target subcool degree calculation section 58 of the controller 32 calculates the target subcool degree TGSC of the radiator 4 from Equation (II) mentioned below in this embodiment.

$$TGSC = Min(TGSCbase, TGSCLim1, TGSCLim2) \quad (II)$$

Figure 4:
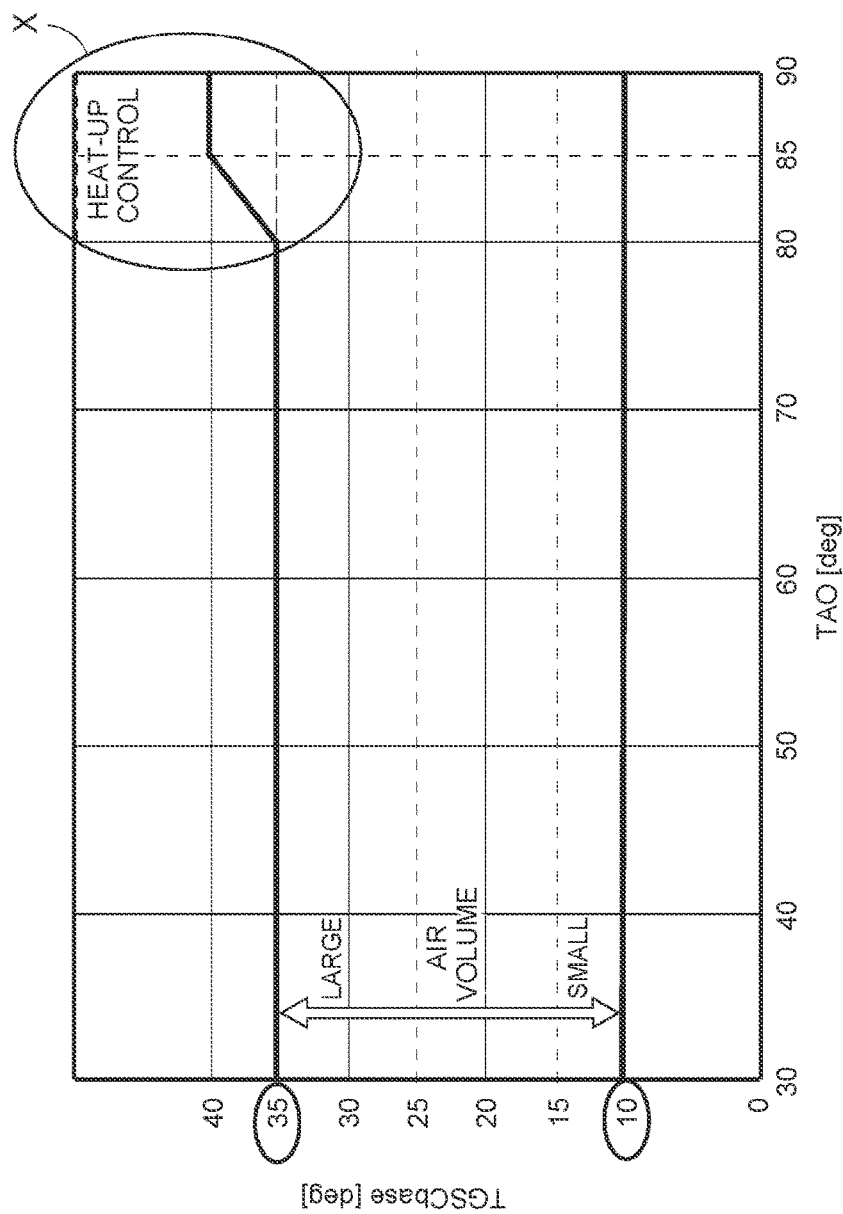
FIG. 4 is a diagram showing one example to determine TGSCbase (a basic value) by the controller of FIG. 2.

TGSCbase in Equation (II) mentioned above is a basic value of the target subcool degree TGSC, and FIG. 4 shows one example to determine the TGSCbase. In this drawing, the radiator target subcool degree calculation section 58 of the controller 32 determines the basic value TGSCbase on the basis of the target outlet temperature TAO and an air volume Ga of the air flow passage 3, but in this case, the basic value is determined so that the larger the air volume Ga is, the larger the basic value TGSCbase becomes.

A bold line of TGSCbase=10 deg. in this drawing indicates, for example, a basic value TGSCbase at the air volume Ga=100 m³/h, and a bold line of TGSCbase=35 deg. indicates the basic value TGSCbase at the air volume Ga=300 m³/h, and the basic value TGSCbase changes between 10 deg. and 35 deg. in accordance with the air volume Ga. However, in a situation of a large air volume (300 m³/h), the radiator target subcool degree calculation section 58 of the controller 32 performs heat-up control to increase the basic value TGSCbase in a region where the target outlet temperature TAO is high (a region which is denoted with X in FIG. 4 and in which the temperature is higher than 80° C.) That is, the section judges whether or not it is an initial period after startup, in accordance with the target outlet temperature TAO, and increases the basic value TGSCbase, thereby delaying proceeding of frosting onto the outdoor heat exchanger 7.

Figure 5:
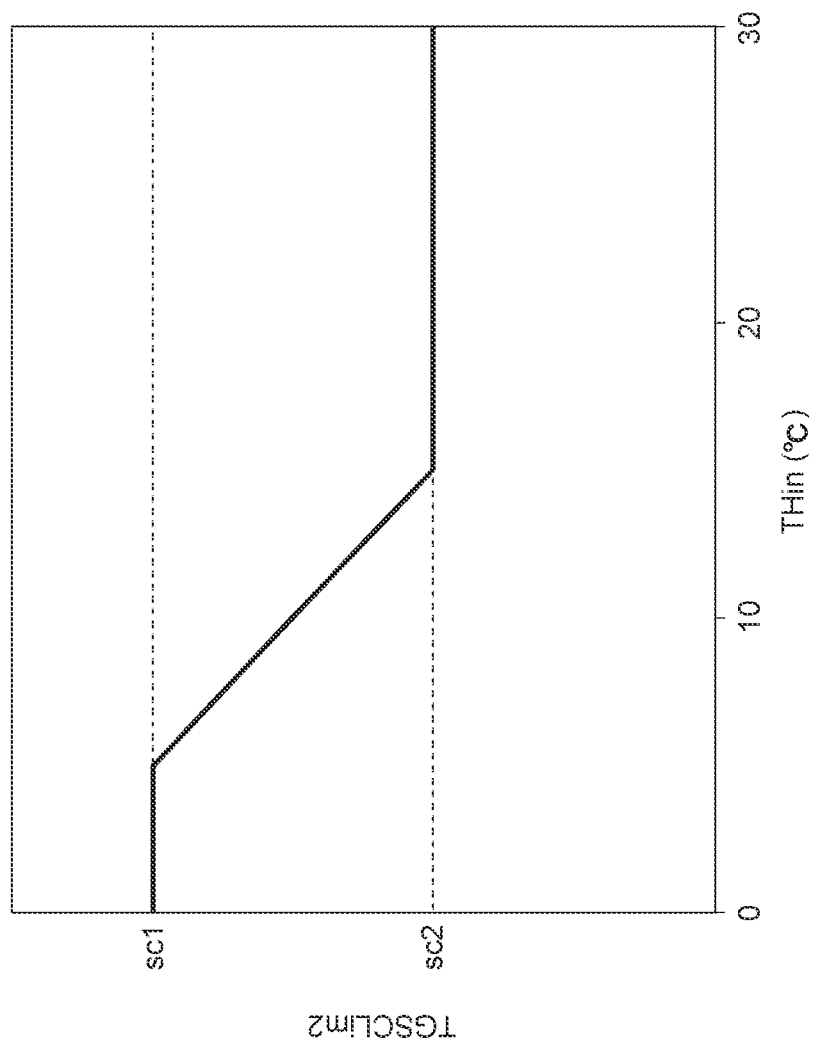
FIG. 5 is a diagram showing one example to determine TGSCLim2 (an offset by a radiator inlet air temperature THin) by the controller of FIG. 2 (Embodiment 1)

Next, TGSCLim2 in Equation (II) mentioned above is an offset of the target subcool degree TGSC by the radiator inlet air temperature THin (the temperature of the air flowing into the radiator 4), and FIG. 5 shows one example to determine the offset TGSCLim2. The radiator target subcool degree calculation section 58 of the controller 32 adjusts the offset TGSCLim2 into sc1 at the radiator inlet air temperature THin of, for example, 5° C. or less, and adjusts the offset into sc2 at 15° C. or more. In a case where the radiator inlet air temperature THin is between 5° C. and 15° C., the offset linearly changes between sc1 and sc2. The sc1 and sc2 have a relation of sc1>sc2, sc1 is a value higher than the above-mentioned 35 deg., and sc2 is a value lower than 35 deg. and higher than 10 deg.

That is, the radiator target subcool degree calculation section 58 of the controller 32 adjusts the offset TGSCLim2 into sc1 when the radiator inlet air temperature THin is low and rises to 5° C., and gradually decreases the offset TGSCLim2 toward sc2 as the radiator inlet air temperature rises in excess of 5° C. Then, the section adjusts the offset into sc2 at the radiator inlet air temperature THin which is above 15° C. Therefore, the radiator target subcool degree calculation section 58 of the controller 32 changes the offset TGSCLim2 in a decreasing direction as the radiator inlet air temperature THin rises.

Figure 6:
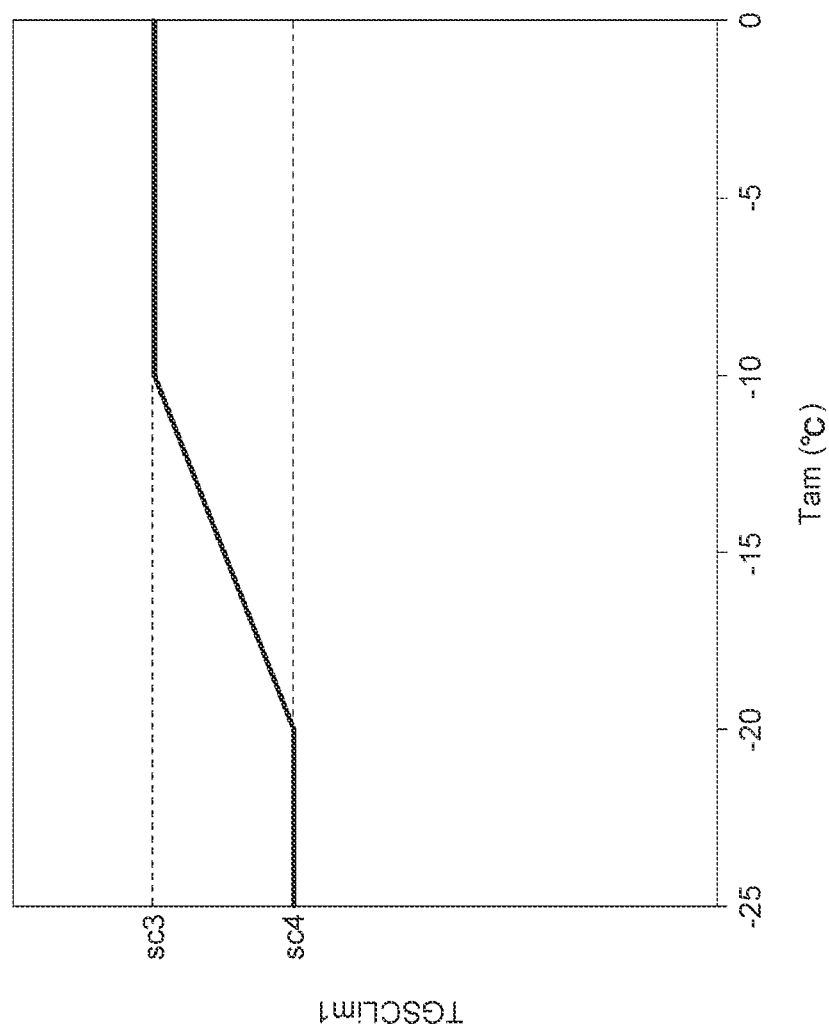
FIG. 6 is a diagram showing one example to determine TGSCLim1 (an offset by an outdoor air temperature Tam) by the controller of FIG. 2 (Embodiment 1)

Next, TGSCLim1 in Equation (II) mentioned above is an offset of the target subcool degree TGSC by the outdoor air temperature Tam, and FIG. 6 shows the offset TGSCLim1. The radiator target subcool degree calculation section 58 of the controller 32 adjusts the offset TGSCLim1 into sc4 at the outdoor air temperature Tam which is, for example, −20° C. or less, and adjusts the offset into sc3 at the temperature which is −10° C. or more. In a case where the outdoor air temperature Tam is between −20° C. and −10° C., the offset linearly changes between sc4 and sc3. The sc3 and sc4 have a relation of sc3>sc4, sc3 is equal to sc1 mentioned above, and sc4 is a value higher than sc2.

That is, the radiator target subcool degree calculation section 58 of the controller 32 adjusts the offset TGSCLim1 into sc3 when the outdoor air temperature Tam is high and lowers to −10° C., and gradually decreases the offset TGSCLim1 toward sc4 as the temperature lowers below −10° C. Then, the section adjusts the offset into sc4 at the outdoor air temperature Tam which is below −20° C. Therefore, the radiator target subcool degree calculation section 58 of the controller 32 changes the offset TGSCLim1 in a decreasing direction as the outdoor air temperature Tam lowers.

Then, the radiator target subcool degree calculation section 58 of the controller 32 determines, as the target subcool degree TGSC, the smallest value among the basic value TGSCbase, the offset TGSCLim1 and the offset TGSCLim2. Therefore, the radiator target subcool degree calculation section 58 of the controller 32 sets a basic value to TGSCbase, and selects a smaller offset in a case where the offset TGSCLim2 or TGSCLim1 is smaller than the basic value TGSCbase. Consequently, the radiator target subcool degree calculation section 58 of the controller 32 lowers the target subcool degree TGSC as the radiator inlet air temperature THin rises, and corrects the target subcool degree TGSC in a lowering direction as the outdoor air temperature Tam lowers.

In this way, the radiator target subcool degree calculation section 58 corrects the target subcool degree TGSC of the radiator 4 in the lowering direction when the radiator inlet air temperature THin rises due to heating by the heating medium-air heat exchanger 40 of the heating medium circulating circuit 23, so that it is possible to eliminate temperature unevenness of the radiator 4 generated because the refrigerant subcool degree SC of the radiator 4 is high, and comfortable vehicle interior air conditioning is achievable.

Furthermore, the section corrects the target subcool degree TGSC of the radiator 4 in the lowering direction as the outdoor air temperature Tam lowers, so that it is possible to eliminate the temperature unevenness of the radiator 4 generated because the refrigerant subcool degree SC of the radiator 4 is high, when the refrigerant flow rate decreases due to drop of the outdoor air temperature Tam.

It is to be noted that in the embodiment, the radiator target subcool degree calculation section 58 of the controller 32 fixes the valve position of the outdoor expansion valve 6 to a predetermined position in a case where the radiator inlet air temperature THin is a temperature higher than a predetermined high value, e.g., 30° C. When the radiator inlet air temperature THin rises as much as a predetermined value or more due to the heating of the heating medium-air heat exchanger 40 of the heating medium circulating circuit 23, the refrigerant subcool degree SC of the radiator 4 is substantially uncontrollable by the outdoor expansion valve 6, but in such a situation, the section fixes the valve position to the predetermined valve position, thereby making it possible to eliminate the disadvantage that the control of the outdoor expansion valve 6 falls in an unintended situation.

Embodiment 2

(8-2) Control of Target Subcool Degree TGSC of Radiator 4 (Embodiment 2)

Figure 7:
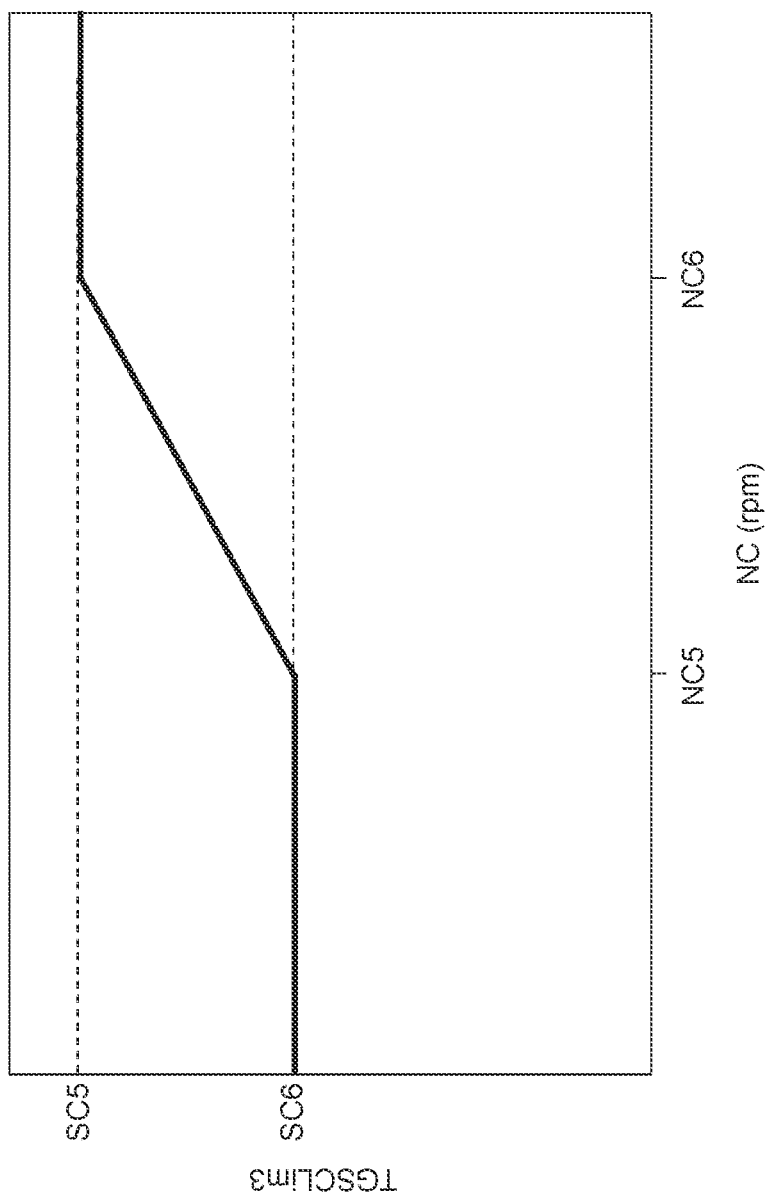
FIG. 7 is a diagram showing one example to determine TGSCLim3 (an offset by a number of revolution NC) by the controller of FIG. 2 (Embodiment 2)

Next, FIG. 7 shows another embodiment concerning correction of a target subcool degree TGSC of a radiator 4. In this case, an offset TGSCLim3 by a number of revolution NC of a compressor 2 is added to Equation (II) mentioned above, or TGSCLim3 is added to replace each offset TGSCLim1 and/or TGSCLim2 mentioned above, thereby determining the target subcool degree TGSC. A radiator target subcool degree calculation section 58 of a controller 32 adjusts the offset TGSCLim3 into sc6 at the number of revolution NC of the compressor 2 which is a predetermined value NC5 or less, and adjusts the offset into sc5 when the number of revolution is a predetermined value NC6 or more. The offset linearly changes between sc6 and sc5 in a case where the number of revolution NC is between NC5 and NC6. The sc5 and sc6 have a relation of sc5>sc6.

That is, the radiator target subcool degree calculation section 58 of the controller 32 adjusts the offset TGSCLim3 into sc5 when the number of revolution NC of the compressor 2 is high and lowers to NC6, and gradually decreases the offset TGSCLim3 toward sc6 as the number of revolution decreases below NC6. Then, the section adjusts the offset into sc6 when the number of revolution NC is smaller than NC5. Therefore, the radiator target subcool degree calculation section 58 of the controller 32 changes the offset TGSCLim3 in a decreasing direction as the number of revolution NC of the compressor 2 decreases.

Then, the radiator target subcool degree calculation section 58 of the controller 32 similarly determines, as the target subcool degree TGSC, the smallest value in a basic value TGSCbase and the offset TGSCLim3 (including the other offsets if any). Therefore, the radiator target subcool degree calculation section 58 of the controller 32 sets the basic value to TGSCbase, and selects a smaller offset in a case where the offset TGSCLim3 is smaller than the basic value TGSCbase. Consequently, the radiator target subcool degree calculation section 58 of the controller 32 corrects the target subcool degree TGSC in the lowering direction as the number of revolution NC of the compressor 2 decreases.

In this way, the radiator target subcool degree calculation section 58 corrects the target subcool degree TGSC of the radiator 4 in the lowering direction as the number of revolution NC of the compressor 2 decreases, so that it is possible to eliminate temperature unevenness of the radiator 4 generated because a refrigerant subcool degree SC of the radiator 4 is high, when a refrigerant flow rate decreases due to the decrease of the number of revolution NC of the compressor 2, and comfortable vehicle interior air conditioning is achievable.

Embodiment 3

(8-3) Control of Target Subcool Degree TGSC of Radiator 4 (Embodiment 3)

Figure 8:
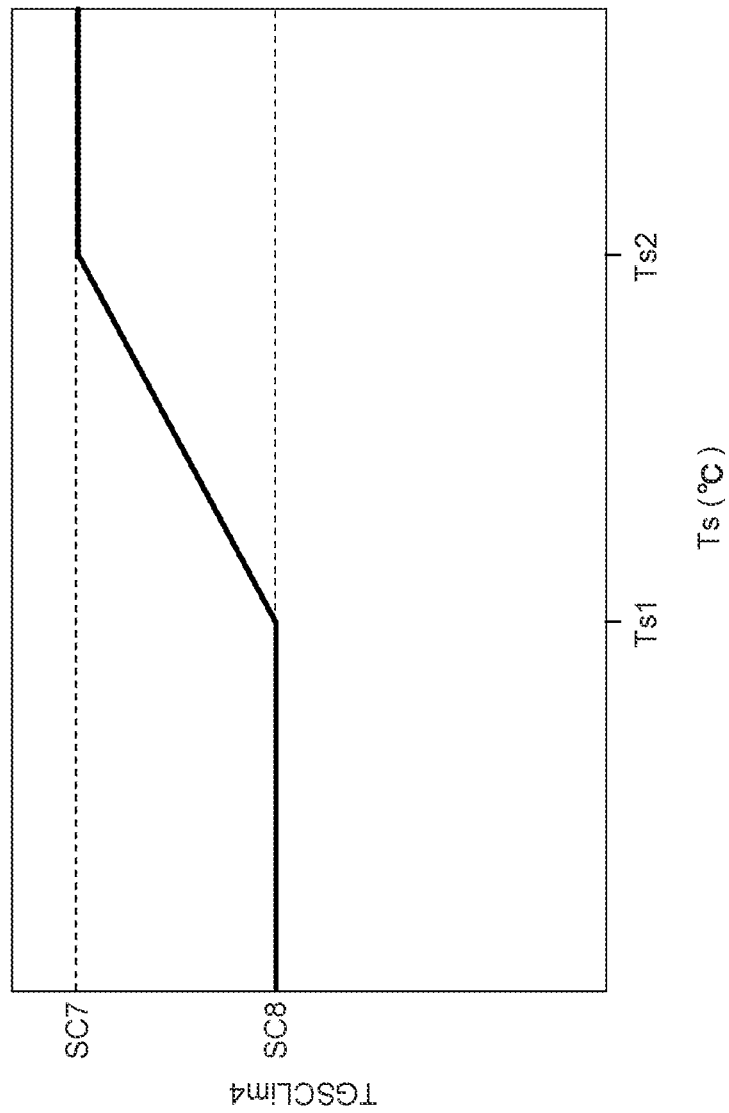
FIG. 8 is a diagram showing one example to determine TGSCLim4 (an offset by a refrigerant suction temperature Ts) by the controller of FIG. 2 (Embodiment 3)

Next, FIG. 8 shows still another embodiment concerning correction of a target subcool degree TGSC of a radiator 4. In this case, an offset TGSCLim4 by a refrigerant suction temperature Ts of a compressor 2 is added to Equation (II) mentioned above, or TGSCLim4 is added to replace the above offset TGSCLim1 and/or TGSCLim2 and/or TGSCLim3, thereby determining the target subcool degree TGSC. A radiator target subcool degree calculation section 58 of a controller 32 adjusts the offset TGSCLim4 into sc8 when the refrigerant suction temperature Ts of the compressor 2 is a predetermined value Ts1 or less, and adjusts the offset into sc7 when the temperature is a predetermined value Ts2 or more. The offset linearly changes between sc8 and sc7 in a case where the refrigerant suction temperature Ts is between Ts1 and Ts2. The sc7 and sc8 have a relation of sc7>sc8.

That is, the radiator target subcool degree calculation section 58 of the controller 32 adjusts the offset TGSCLim4 into sc7 when the refrigerant suction temperature Ts of the compressor 2 is high and lowers to Ts2, and gradually decreases the offset TGSCLim4 toward sc8 as the temperature lowers below Ts2. Then, the section adjusts the offset into sc8 when the refrigerant suction temperature Ts is below Ts1. Therefore, the radiator target subcool degree calculation section 58 of the controller 32 changes the offset TGSCLim4 in a decreasing direction as the refrigerant suction temperature Ts of the compressor 2 lowers.

Then, the radiator target subcool degree calculation section 58 of the controller 32 similarly determines, as the target subcool degree TGSC, the smallest value in a basic value TGSCbase and the offset TGSCLim4 (including the other offsets if any). Therefore, the radiator target subcool degree calculation section 58 of the controller 32 sets the basic value to TGSCbase, and selects a smaller offset in a case where the offset TGSCLim4 is smaller than the basic value TGSCbase. Consequently, the radiator target subcool degree calculation section 58 of the controller 32 corrects the target subcool degree TGSC in a lowering direction as the refrigerant suction temperature Ts of the compressor 2 lowers.

In this case, the radiator target subcool degree calculation section 58 corrects the target subcool degree TGSC of the radiator 4 in a lowering direction as the refrigerant suction temperature Ts of the compressor 2 lowers, so that in a situation where the refrigerant suction temperature Ts of the compressor 2 lowers and a number of revolution of the compressor 2 also decreases to decrease a refrigerant flow rate, it is possible to eliminate temperature unevenness of the radiator 4 generated because a refrigerant subcool degree SC of the radiator 4 is high, and comfortable vehicle interior air conditioning is achievable.

Embodiment 4

(8-4) Control of Target Subcool Degree TGSC of Radiator 4 (Embodiment 4)

Figure 9:
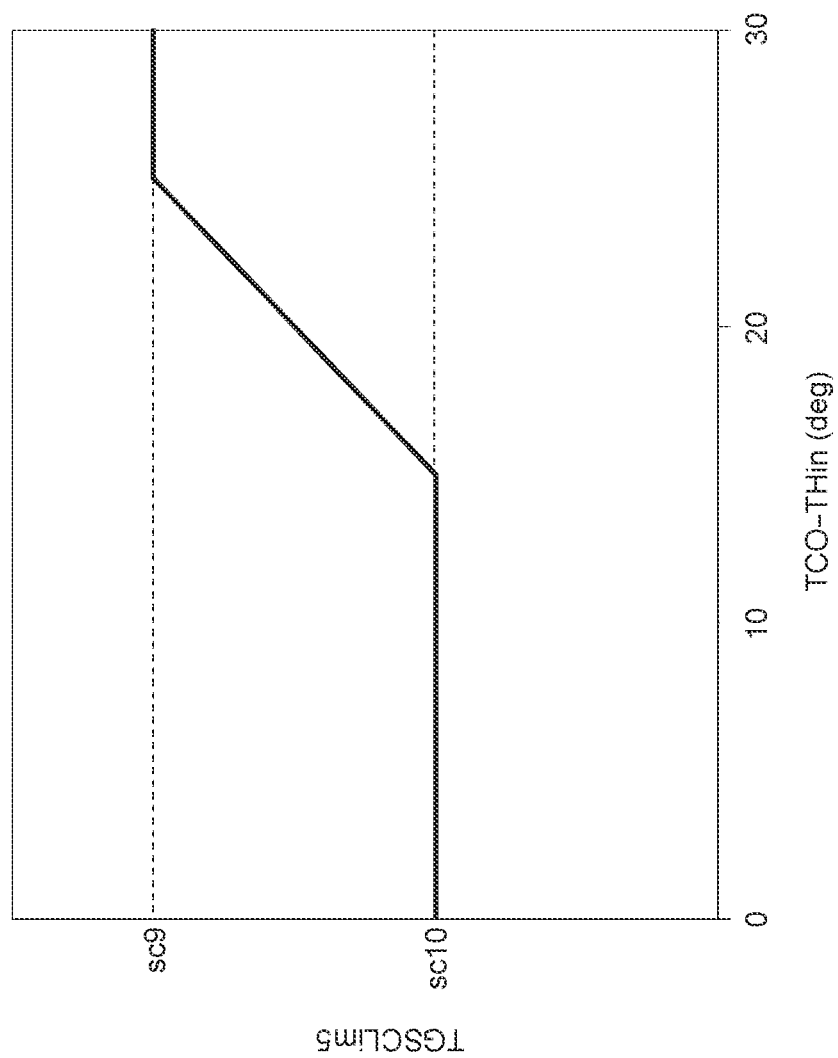
FIG. 9 is a diagram showing one example to determine TGSCLim5 (an offset by TCO−THin) by the controller of FIG. 2 (Embodiment 4)

Next, FIG. 9 shows a further embodiment concerning correction of a target subcool degree TGSC of a radiator 4. In this case, an offset TGSCLim5 by a difference (TCO−THin) between a radiator target temperature TCO and a radiator inlet air temperature THin is added to Equation (II) mentioned above, or TGSCLim5 is added to replace the above respective offsets TGSCLim1 to TGSCLim4 and the like, thereby determining the target subcool degree TGSC. A radiator target subcool degree calculation section 58 of a controller 32 adjusts the offset TGSCLim5 into sc10 when the difference (TCO−THin) is, for example, 15 deg. or less, and adjusts the offset into sc9 when the difference is, for example, 25 deg. or more. The offset linearly changes between sc9 and sc10 in a case where the difference (TCO−THin) is between Ts9 and Ts10. The sc9 and sc10 have a relation of sc9>sc10.

That is, the radiator target subcool degree calculation section 58 of the controller 32 adjusts the offset TGSCLim5 into sc9 when the difference (TCO−THin) is large and decreases to 25 deg., and gradually decreases the offset TGSCLim5 toward sc10 as the difference decreases below 25 deg. Then, the section adjusts the offset into sc10 when the difference (TCO−THin) is smaller than 15 deg. Therefore, the radiator target subcool degree calculation section 58 of the controller 32 changes the offset TGSCLim5 in a decreasing direction as the difference (TCO−THin) decreases.

Then, the radiator target subcool degree calculation section 58 of the controller 32 similarly determines, as the target subcool degree TGSC, the smallest value in a basic value TGSCbase and the offset TGSCLim5 (including the other offsets if any). Therefore, the radiator target subcool degree calculation section 58 of the controller 32 sets the basic value to TGSCbase, and selects a smaller offset in a case where the offset TGSCLim5 is smaller than the basic value TGSCbase. Consequently, the radiator target subcool degree calculation section 58 of the controller 32 corrects the target subcool degree TGSC in a lowering direction as the difference (TCO−THin) decreases.

In this case, the radiator target subcool degree calculation section 58 corrects the target subcool degree TGSC of the radiator 4 in the lowering direction as the difference (TCO−THin) decreases, so that when the radiator inlet air temperature THin rises due to heating by a heating medium-air heat exchanger 40 of a heating medium circulating circuit 23 and the difference (TCO−THin) decreases, it is possible to eliminate temperature unevenness of the radiator 4 generated because a refrigerant subcool degree SC of the radiator 4 is high, and comfortable vehicle interior air conditioning is achievable.

Embodiment 5

(9-1) Correction Control of Target Number of Revolution TGNC of Compressor 2 (Embodiment 5)

Figure 10:
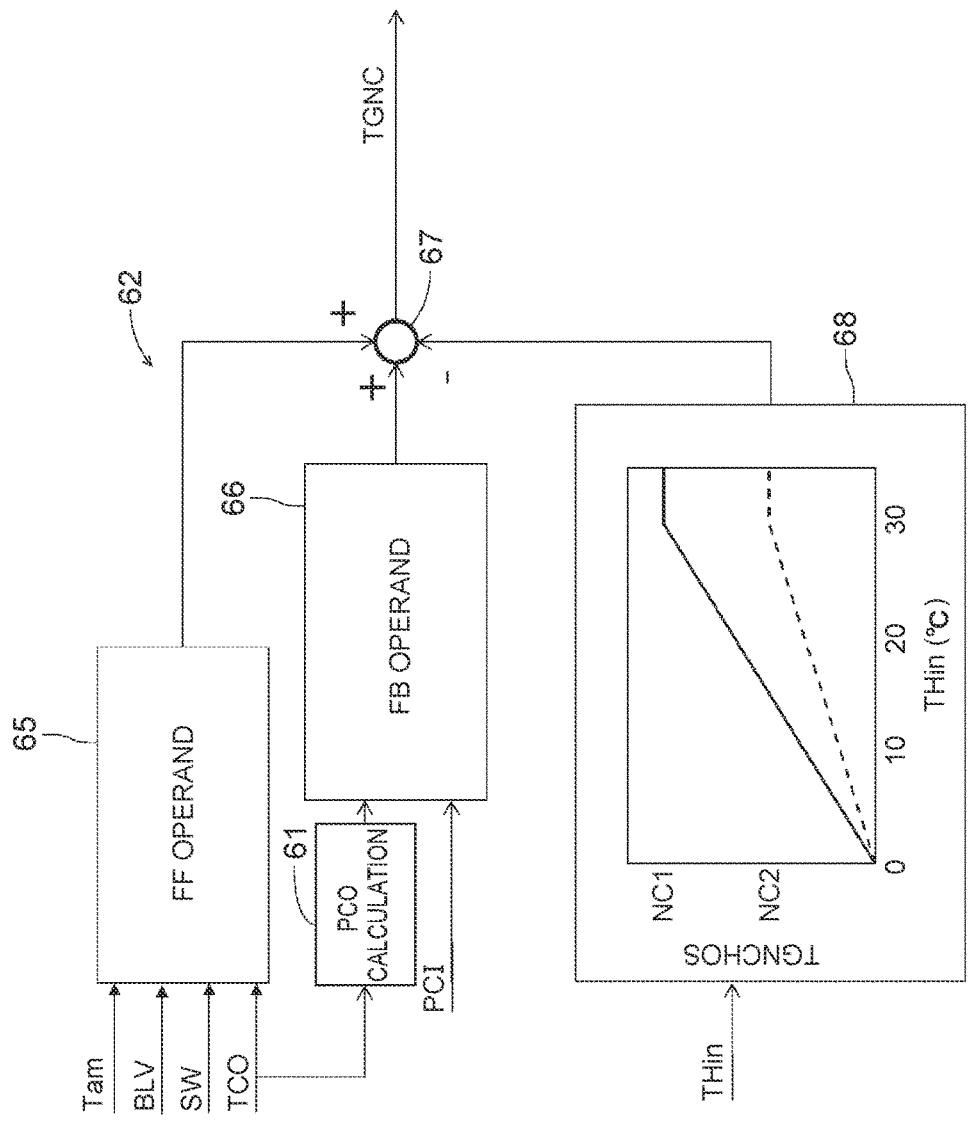
FIG. 10 is a diagram showing one example of correction control of TGNC by THin in the controller of FIG. 2 (Embodiment 5)
Figure 11:
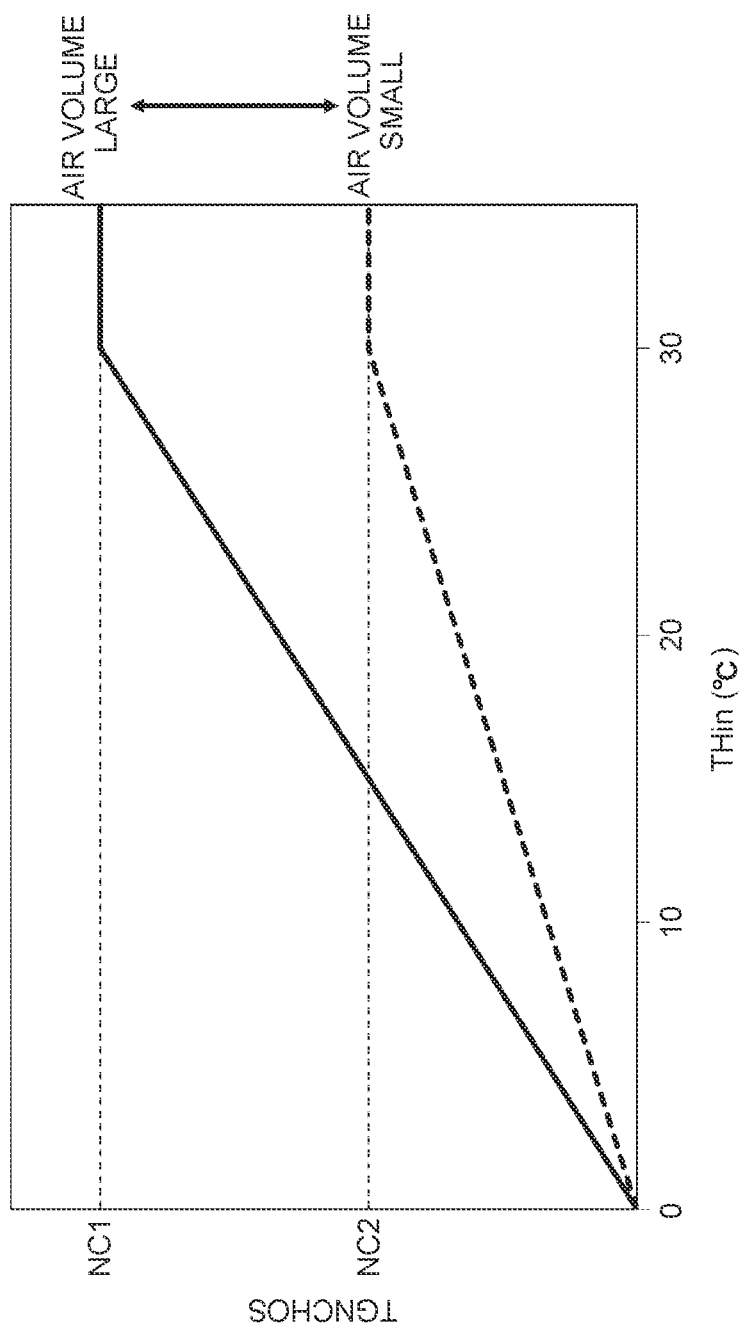
FIG. 11 is a diagram showing a relation between THin and TGNCHOS (an offset of TGNC) in FIG. 10.

Next, FIG. 10 and FIG. 11 show an example to correct a target number of revolution TGNC of a compressor 2 with a radiator inlet air temperature THin. It is to be noted that in FIG. 10, components denoted with the same reference numerals as in FIG. 3 are the same components. FIG. 10 shows a detailed constitution of another example of a compressor revolution number calculation section 62 of a controller 32 of FIG. 3. An F/F (feedforward) control amount calculation section 65 of the compressor revolution number calculation section 62 calculates an F/F control amount TGNCff of the target number of revolution TGNC of the compressor 2 on the basis of an outdoor air temperature Tam obtainable from an outdoor air temperature sensor 33, a blower voltage BLV of an indoor blower 27, an air mix damper position SW of an air mix damper 28 which is obtainable from SW=(TAO−Te)/(TH−Te), and a radiator target temperature TCO.

It is to be noted that the air mix damper position SW changes in a range of 0≤SW≤1, 0 indicates an air mix shut off state where air does not pass through a radiator 4 and 1 indicates an air mix fully open state to pass all the air in an air flow passage 3 through the radiator 4.

Furthermore, an F/B (feedback) control amount calculation section 66 calculates an F/B control amount TGNCfb of the target number of revolution TGNC of the compressor 2 on the basis of a radiator target pressure PCO calculated in a radiator target pressure calculation section 61 and a radiator pressure PCI that is a refrigerant pressure of the radiator 4. FIG. 11 shows a correcting section 68 of FIG. 10 in detail. The correcting section 68 calculates an offset TGNCHOS of the target number of revolution TGNC of the compressor 2 on the basis of a radiator inlet air temperature THin. In this case, the correcting section 68 increases the offset TGNCHOS on the basis of the radiator inlet air temperature THin, as the radiator inlet air temperature THin rises. In this case, the section gradually increases TGNCHOS from 0° C. when an air volume Ga of the air flow passage 3 is large, adjusts the offset into NC1 at 30° C., and increases the offset up to NC2 at 30° C. when the air volume Ga is small (NC1>NC2). That is, the section increases the offset TGNCHOS as the air volume Ga increases.

Then, the F/F control amount TGNCff calculated by the F/F control amount calculation section 65 and TGNCfb calculated by the F/B control amount calculation section 66 are added in an adder 67, and the offset TGNCHOS calculated by the correcting section 68 is subtracted in the adder 67, thereby determining the compressor target number of revolution TGNC. That is, the compressor revolution number calculation section 62 of the controller 32 corrects the target number of revolution TGNC of the compressor 2 in a decreasing direction as the radiator inlet air temperature THin rises.

When the radiator inlet air temperature THin rises due to heating by a heating medium-air heat exchanger 40, a temperature of air blown out to a vehicle interior noticeably varies in accordance with an operation situation of the compressor 2, but as in this embodiment, the section corrects the target number of revolution TGNC of the compressor 2 in the decreasing direction as the radiator inlet air temperature THin rises, thereby making it possible to inhibit such a temperature variation.

Embodiment 6

(9-2) Correction Control of Target Number of Revolution TGNC of Compressor 2 (Embodiment 6)

Figure 12:
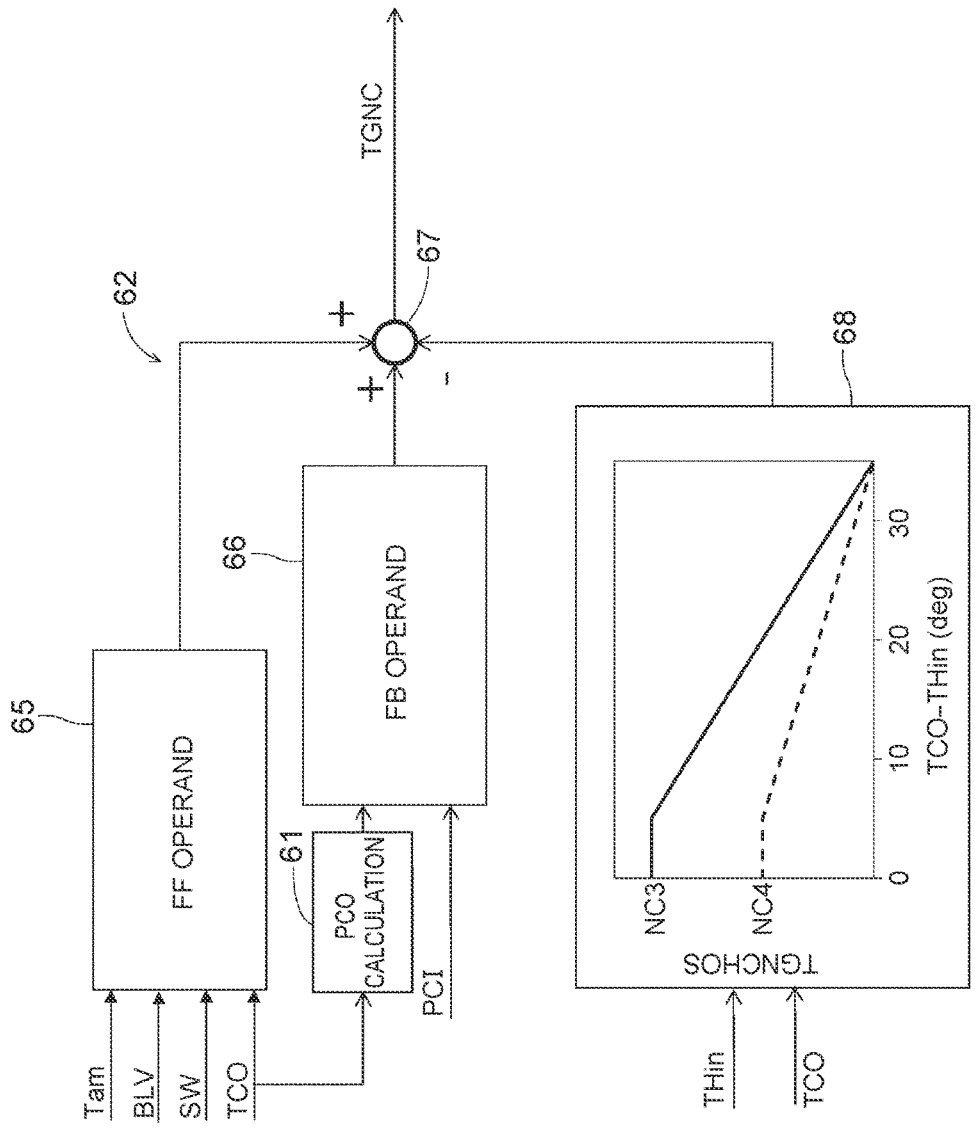
FIG. 12 is a diagram showing one example of correction control of TGNC by (TCO−THin) in the controller of FIG. 2 (Embodiment 6)
Figure 13:
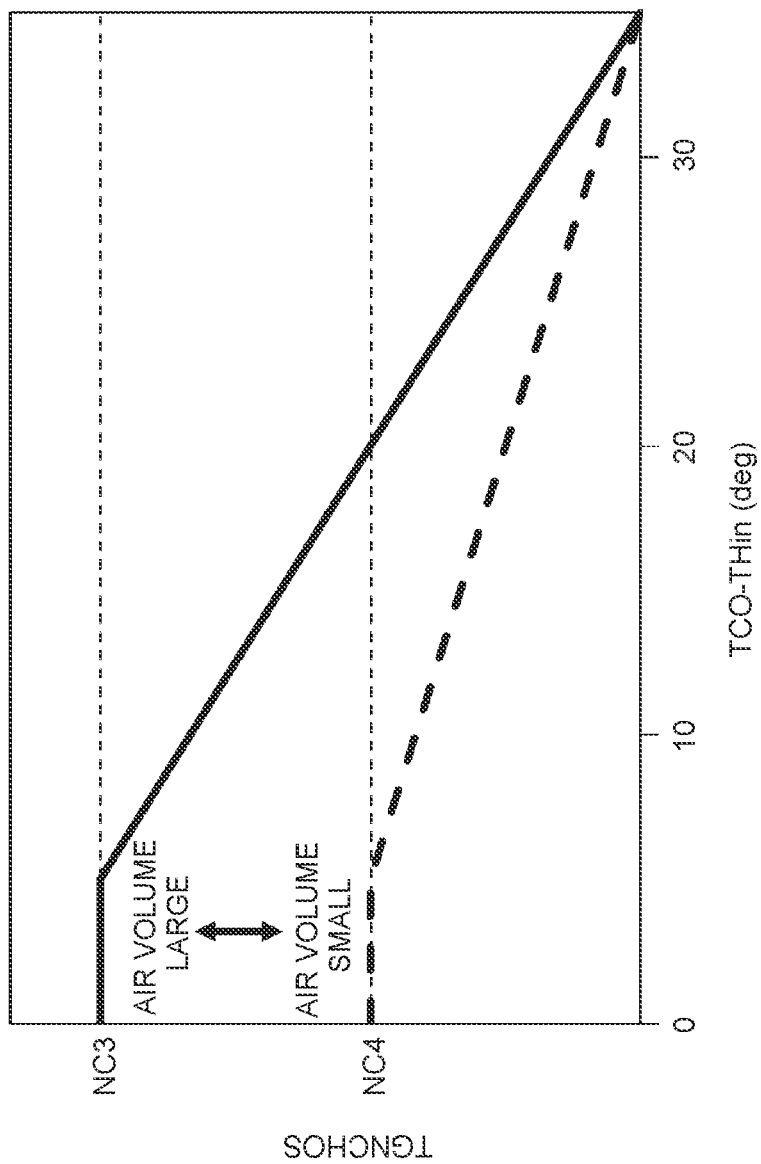
FIG. 13 is a diagram showing a relation between (TCO−THin) and TGNCHOS in FIG. 12.

Next, FIG. 12 and FIG. 13 show an example to correct a target number of revolution TGNC of a compressor 2 with a difference (TCO−THin) between a radiator target temperature TCO and a radiator inlet air temperature THin. It is to be noted that in FIG. 12, components denoted with the same reference numerals as in FIG. 3 are the same components. FIG. 12 shows a detailed constitution of still another example of a compressor revolution number calculation section 62 of a controller 32 of FIG. 3. Also in this case, an F/F (feedforward) control amount calculation section 65 of the compressor revolution number calculation section 62 calculates an F/F control amount TGNCff of the target number of revolution TGNC of the compressor 2 on the basis of an outdoor air temperature Tam obtainable from an outdoor air temperature sensor 33, a blower voltage BLV of an indoor blower 27, an air mix damper position SW, and a radiator target temperature TCO.

Furthermore, an F/B (feedback) control amount calculation section 66 similarly calculates an F/B control amount TGNCfb of the target number of revolution TGNC of the compressor 2 on the basis of a radiator target pressure PCO calculated in a radiator target pressure calculation section 61 and a radiator pressure PCI that is a refrigerant pressure of the radiator 4. FIG. 13 shows a correcting section 68 of FIG. 12 in detail. In this case, the correcting section 68 calculates an offset TGNCHOS of the target number of revolution TGNC of the compressor 2 on the basis of the radiator inlet air temperature THin and the radiator target temperature TCO. In this case, the correcting section 68 increases the offset TGNCHOS on the basis of the difference (TCO−THin) between the radiator target temperature TCO and the radiator inlet air temperature THin, as the difference (TCO−THin) decreases. In this case, the section gradually increases TGNCHOS from zero at a difference of 30 deg. or more when an air volume Ga of an air flow passage 3 is large, adjusts the offset into NC3 at about 5 deg., and increases the offset up to NC4 when the air volume Ga is small (NC3>NC4). That is, the section increases the offset TGNCHOS as the air volume Ga increases.

Then, the F/F control amount TGNCff calculated by the F/F control amount calculation section 65 and TGNCfb calculated by the F/B control amount calculation section 66 are added in an adder 67, and the offset TGNCHOS calculated by the correcting section 68 is subtracted in the adder 67, thereby determining the compressor target number of revolution TGNC. That is, the compressor revolution number calculation section 62 of the controller 32 corrects the target number of revolution TGNC of the compressor 2 in a decreasing direction as the difference (TCO−THin) between the radiator target temperature TCO and the radiator inlet air temperature THin decreases.

When the radiator inlet air temperature THin rises due to heating by a heating medium-air heat exchanger 40 and the difference (TCO−THin) decreases, a temperature of air blown out to a vehicle interior noticeably varies in accordance with an operation situation of the compressor 2, but as in this embodiment, the section corrects the target number of revolution TGNC of the compressor 2 in the decreasing direction as the difference (TCO−THin) decreases, thereby making it possible to inhibit such a temperature variation.

Embodiment 7

(10-1) Correction Control of Minimum Valve Position of Outdoor Expansion Valve 6 (Embodiment 7)

Next, there will be described correction of a minimum valve position of controlling of an outdoor expansion valve 6 by a target outdoor expansion valve position calculation section 64 of a controller 32. When a radiator inlet air temperature THin rises due to heating by a heating medium-air heat exchanger 40 and its difference from a radiator target temperature TCO is eliminated, a required heating capability decreases, and hence a refrigerant flow rate in a refrigerant circuit R also decreases. Therefore, setting of control of a valve position of the outdoor expansion valve 6 is not matched.

Figure 14:
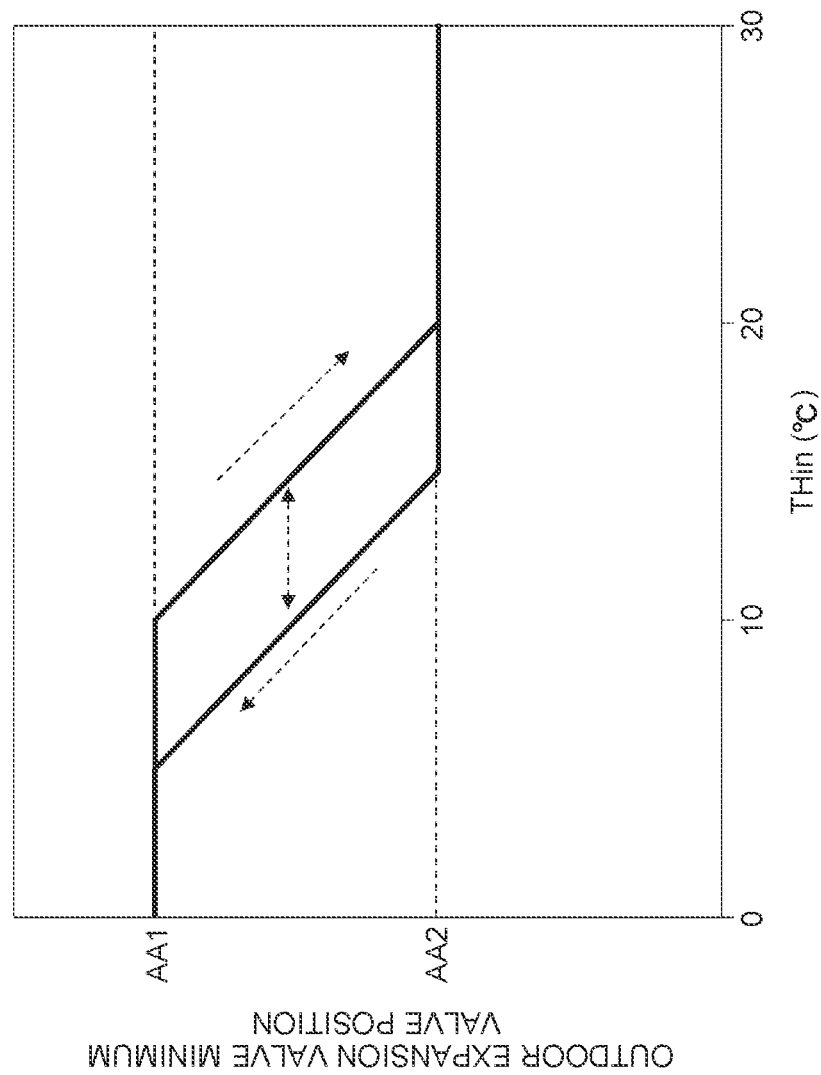
FIG. 14 is a diagram showing one example of minimum valve position control of an outdoor expansion valve by the radiator inlet air temperature THin in the controller of FIG. 2 (Embodiment 7)

Thus, in this embodiment, the target outdoor expansion valve position calculation section 64 of the controller 32 corrects a lower limit value of a target outdoor expansion valve position TGECCV of the outdoor expansion valve 6 to be calculated, i.e., a minimum valve position LLECCV of the outdoor expansion valve 6 on the basis of the radiator inlet air temperature THin as shown in FIG. 14. That is, the target outdoor expansion valve position calculation section 64 adjusts the minimum valve position LLECCV of the outdoor expansion valve 6 into, for example, a predetermined value AA1 in a situation where the radiator inlet air temperature THin is low. Then, in a case where THin rises to, for example, 10° C. due to the heating by the heating medium-air heat exchanger 40, or the like, the section gradually (linearly) lowers the minimum valve position LLECCV to a predetermined value AA2 (AA2<AA1) until the temperature rises to 20° C., and also afterward, in a case where THin rises, the section maintains the minimum valve position LLECCV at AA2.

Then, in a case where the radiator inlet air temperature THin lowers from a high situation and reaches, for example, 15° C. (hysteresis is provided), the section gradually (linearly) raises the minimum valve position LLECCV up to the predetermined value AA1 until the temperature lowers to 5° C., and afterward, in a case where THin lowers, the section maintains the minimum valve position LLECCV at AA1.

In this way, on the basis of the radiator inlet air temperature THin, the section corrects the minimum valve position LLECCV of the outdoor expansion valve 6 in a lowering direction as the radiator inlet air temperature THin rises. Therefore, in a situation where the radiator inlet air temperature THin rises due to the heating by the heating medium-air heat exchanger 40, or the like, and the refrigerant flow rate decreases, the section lowers the minimum valve position LLECCV of the outdoor expansion valve 6 and can match the setting of the valve position of the outdoor expansion valve 6 with such a situation. Consequently, decrease of power consumption is achievable.

Embodiment 8

(10-2) Correction Control of Minimum Valve Position of Outdoor Expansion Valve 6 (Embodiment 8)

Figure 15:
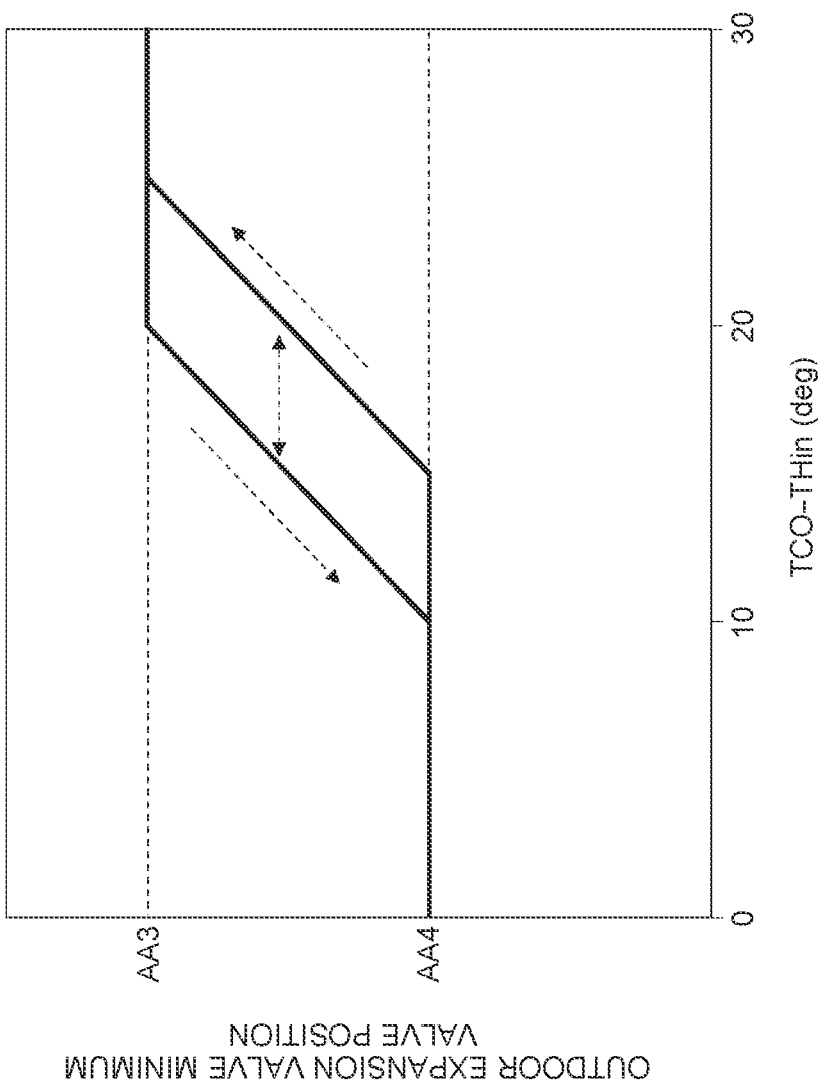
FIG. 15 is a diagram showing one example of the minimum valve position control of the outdoor expansion valve by TCO−THin in the controller of FIG. 2 (Embodiment 8)

Next, FIG. 15 shows another embodiment concerning correction of a minimum valve position of an outdoor expansion valve 6 by a target outdoor expansion valve position calculation section 64 of the above controller 32. In this case, the target outdoor expansion valve position calculation section 64 of the controller 32 corrects a minimum valve position LLECCV of the outdoor expansion valve 6 on the basis of a difference (TCO−THin) between a radiator target temperature TCO and a radiator inlet air temperature THin.

That is, in a situation where the difference (TCO−THin) is large, the target outdoor expansion valve position calculation section 64 adjusts the minimum valve position LLECCV of the outdoor expansion valve 6 into, for example, a predetermined value AA3. Then, in a case where THin rises due to heating by a heating medium-air heat exchanger 40, or the like, and the difference (TCO−THin) decreases to, for example, 20 deg., the section gradually (linearly) lowers the minimum valve position LLECCV to a predetermined value AA4 (AA4<AA3) until the difference decreases to 10 deg., and also afterward, in a case where the difference (TCO−THin) decreases, the section maintains the minimum valve position LLECCV at AA4.

Then, in a case where the difference (TCO−THin) increases from a small situation and reaches, for example, 15 deg. (hysteresis is provided), the section gradually (linearly) raises the minimum valve position LLECCV up to the predetermined value AA3 until the difference enlarges to 25 deg., and afterward, in a case where the difference (TCO−THin) enlarges, the section maintains the minimum valve position LLECCV at AA3.

In this way, on the basis of the difference (TCO−THin) between the radiator target temperature TCO and the radiator inlet air temperature THin, the section corrects the minimum valve position LLECCV of the outdoor expansion valve 6 in a lowering direction as the difference (TCO−THin) decreases. Therefore, in a situation where the radiator inlet air temperature THin rises due to the heating by the heating medium-air heat exchanger 40, or the like, and the difference (TCO−THin) decreases to decrease a refrigerant flow rate, the section lowers the minimum valve position LLECCV of the outdoor expansion valve 6 and can match the setting of the valve position of the outdoor expansion valve 6 with such a situation. Consequently, decrease of power consumption is similarly achievable.

Embodiment 9

(10-3) Correction Control of Minimum Valve Position of Outdoor Expansion Valve 6 (Embodiment 9)

Figure 16:
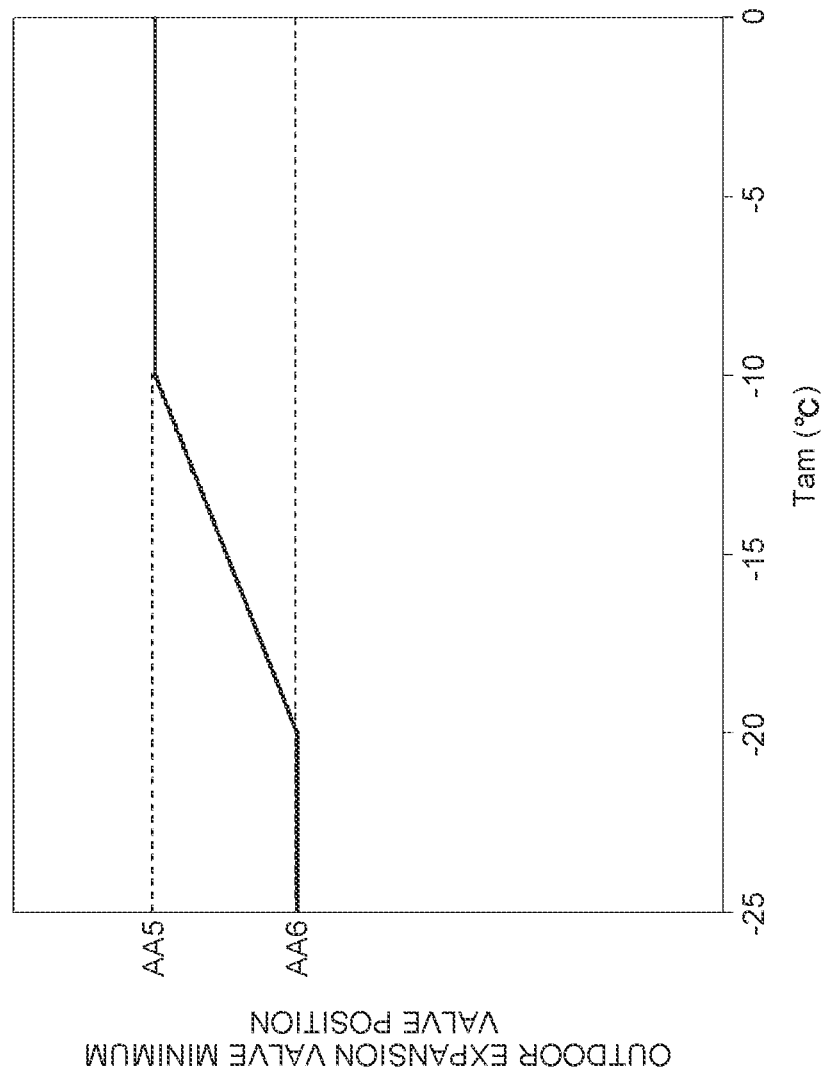
FIG. 16 is a diagram showing one example of the minimum valve position control of the outdoor expansion valve by the outdoor air temperature Tam in the controller of FIG. 2 (Embodiment 9)

Next, FIG. 16 shows still another embodiment concerning correction of a minimum valve position of an outdoor expansion valve 6 by a target outdoor expansion valve position calculation section 64 of the above controller 32. In this case, the target outdoor expansion valve position calculation section 64 of the controller 32 corrects a minimum valve position LLECCV of the outdoor expansion valve 6 on the basis of an outdoor air temperature Tam.

That is, in a situation where the outdoor air temperature Tam is high, the target outdoor expansion valve position calculation section 64 adjusts the minimum valve position LLECCV of the outdoor expansion valve 6 into, for example, a predetermined value AA5. Then, in a case where the outdoor air temperature Tam lowers to, for example, −10° C., the section gradually (linearly) lowers the minimum valve position LLECCV to a predetermined value AA6 (AA6<AA5) until the temperature lowers to −20° C., and also afterward, in a case where the outdoor air temperature Tam lowers, the section maintains the minimum valve position LLECCV at AA6.

Then, in a case where the outdoor air temperature Tam rises from a low situation to −20° C., the section gradually (linearly) raises the minimum valve position LLECCV to the predetermined value AA5 until the temperature rises to −10° C., and afterward, in a case where the outdoor air temperature Tam rises, the section maintains the minimum valve position LLECCV at AA5.

In this way, on the basis of the outdoor air temperature Tam, the section corrects the minimum valve position LLECCV of the outdoor expansion valve 6 in a lowering direction as the outdoor air temperature Tam lowers. Therefore, in a situation where the outdoor air temperature Tam lowers to decrease a refrigerant flow rate, the section lowers the minimum valve position LLECCV of the outdoor expansion valve 6 and can match the setting of the valve position of the outdoor expansion valve 6 with such a situation. Consequently, decrease of power consumption is similarly achievable.

Embodiment 10

(10-4) Correction Control of Minimum Valve Position of Outdoor Expansion Valve 6 (Embodiment 10)

Figure 17:
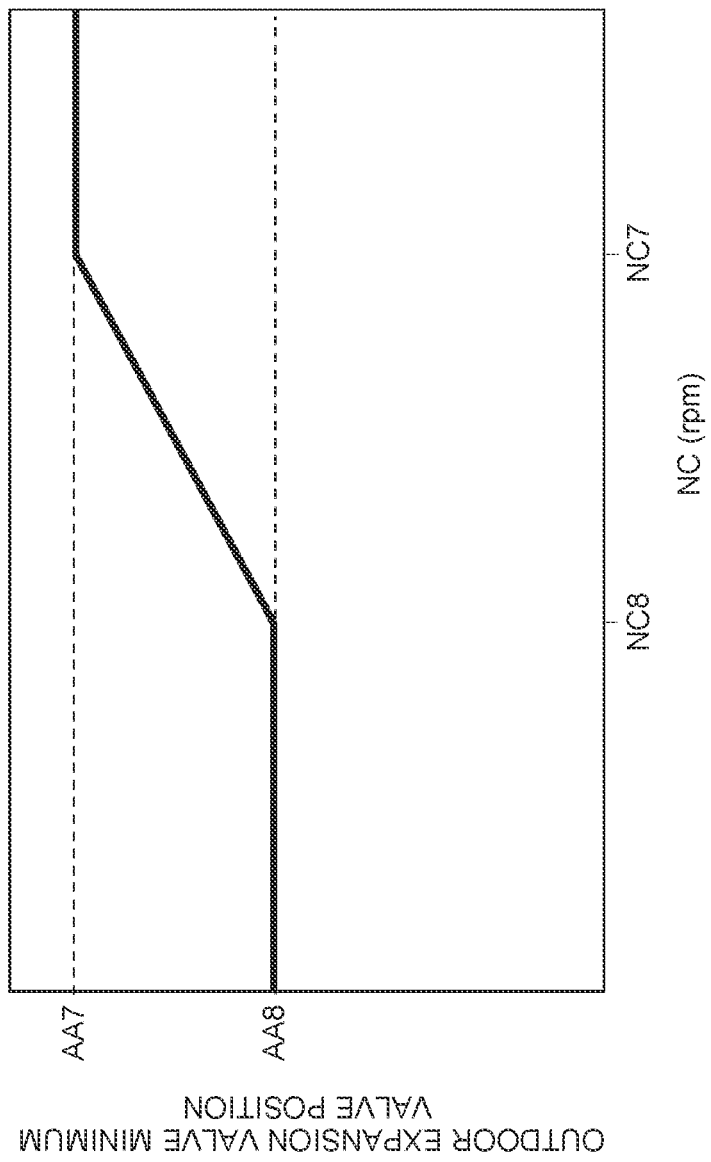
FIG. 17 is a diagram showing one example of the minimum valve position control of the outdoor expansion valve by the number of revolution NC in the controller of FIG. 2 (Embodiment 10)

Next, FIG. 17 shows a further embodiment concerning correction of a minimum valve position of an outdoor expansion valve 6 by a target outdoor expansion valve position calculation section 64 of the above controller 32. In this case, the target outdoor expansion valve position calculation section 64 of the controller 32 corrects a minimum valve position LLECCV of the outdoor expansion valve 6 on the basis of a number of revolution NC of a compressor 2.

That is, in a situation where the number of revolution NC of the compressor 2 is large, the target outdoor expansion valve position calculation section 64 adjusts the minimum valve position LLECCV of the outdoor expansion valve 6 into, for example, a predetermined value AA7. Then, in a case where the number of revolution NC decreases to, for example, a predetermined value NC7, the section gradually (linearly) lowers the minimum valve position LLECCV to a predetermined value AA8 (AA8<AA7) until the number of revolution decreases to a predetermined value NC8 (NC8<NC7), and also afterward, in a case where the number of revolution NC decreases, the section maintains the minimum valve position LLECCV at AA8.

Then, in a case where the number of revolution NC of the compressor 2 increases from a small situation to NC8, the section gradually (linearly) raises the minimum valve position LLECCV to the predetermined value AA7 until the number of revolution increases to NC7, and afterward, in a case where the number of revolution NC increases, the section maintains the minimum valve position LLECCV at AA7.

In this way, on the basis of the number of revolution NC of the compressor 2, the section corrects the minimum valve position LLECCV of the outdoor expansion valve 6 in a lowering direction as the number of revolution NC decreases. Therefore, in a situation where the number of revolution NC of the compressor 2 decreases to decrease a refrigerant flow rate, the section lowers the minimum valve position LLECCV of the outdoor expansion valve 6 and can match the setting of the valve position of the outdoor expansion valve 6 with such a situation. Consequently, decrease of power consumption is similarly achievable.

Embodiment 11

(10-5) Correction Control of Minimum Valve Position of Outdoor Expansion Valve 6 (Embodiment 11)

Figure 18:
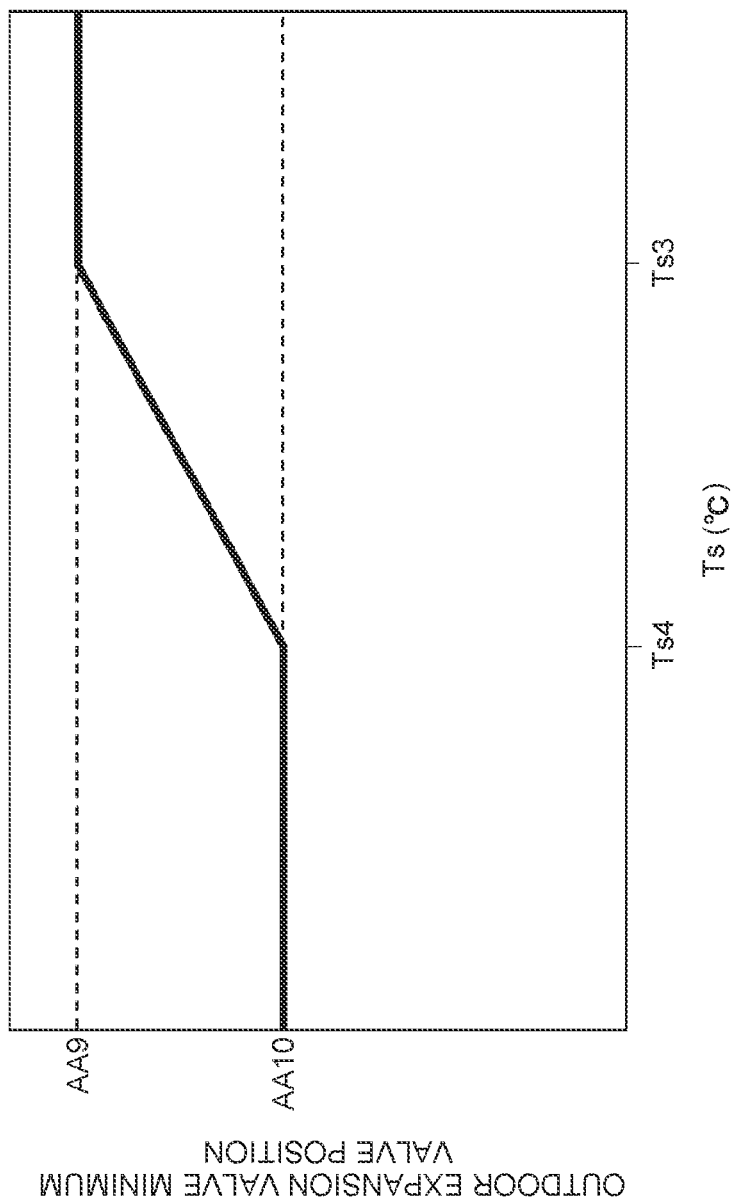
FIG. 18 is a diagram showing one example of the minimum valve position control of the outdoor expansion valve by the refrigerant suction temperature Ts in the controller of FIG. 2 (Embodiment 11)

Next, FIG. 18 shows a still further embodiment concerning correction of a minimum valve position of an outdoor expansion valve 6 by a target outdoor expansion valve position calculation section 64 of the above controller 32. In this case, the target outdoor expansion valve position calculation section 64 of the controller 32 corrects a minimum valve position LLECCV of the outdoor expansion valve 6 on the basis of a refrigerant suction temperature Ts of a compressor 2.

That is, in a situation where the refrigerant suction temperature Ts of the compressor 2 is high, the target outdoor expansion valve position calculation section 64 adjusts the minimum valve position LLECCV of the outdoor expansion valve 6 into, for example, a predetermined value AA9. Then, in a case where the refrigerant suction temperature Ts lowers to, for example, a predetermined value Ts3, the section gradually (linearly) lowers the minimum valve position LLECCV to a predetermined value AA10 (AA10<AA9) until the temperature lowers to a predetermined value Ts4 (Ts4<Ts3), and also afterward, in a case where the refrigerant suction temperature Ts lowers, the section maintains the minimum valve position LLECCV at AA10.

Then, in a case where the refrigerant suction temperature Ts of the compressor 2 rises from a low situation to Ts4, the section gradually (linearly) raises the minimum valve position LLECCV to the predetermined value AA9 until the temperature rises to Ts3, and afterward, in a case where the refrigerant suction temperature Ts rises, the section maintains the minimum valve position LLECCV at AA9.

In this way, on the basis of the refrigerant suction temperature Ts of the compressor 2, the section corrects the minimum valve position LLECCV of the outdoor expansion valve 6 in a lowering direction as the refrigerant suction temperature Ts lowers. Therefore, in a situation where the refrigerant suction temperature Ts of the compressor 2 lowers and a number of revolution of the compressor 2 also decreases to decrease a refrigerant flow rate, the section lowers the minimum valve position LLECCV of the outdoor expansion valve 6 and can match the setting of the valve position of the outdoor expansion valve 6 with such a situation.
Consequently, decrease of power consumption is similarly achievable.

Embodiment 12

(11) Another Example of Control of Compressor 2

Figure 19:
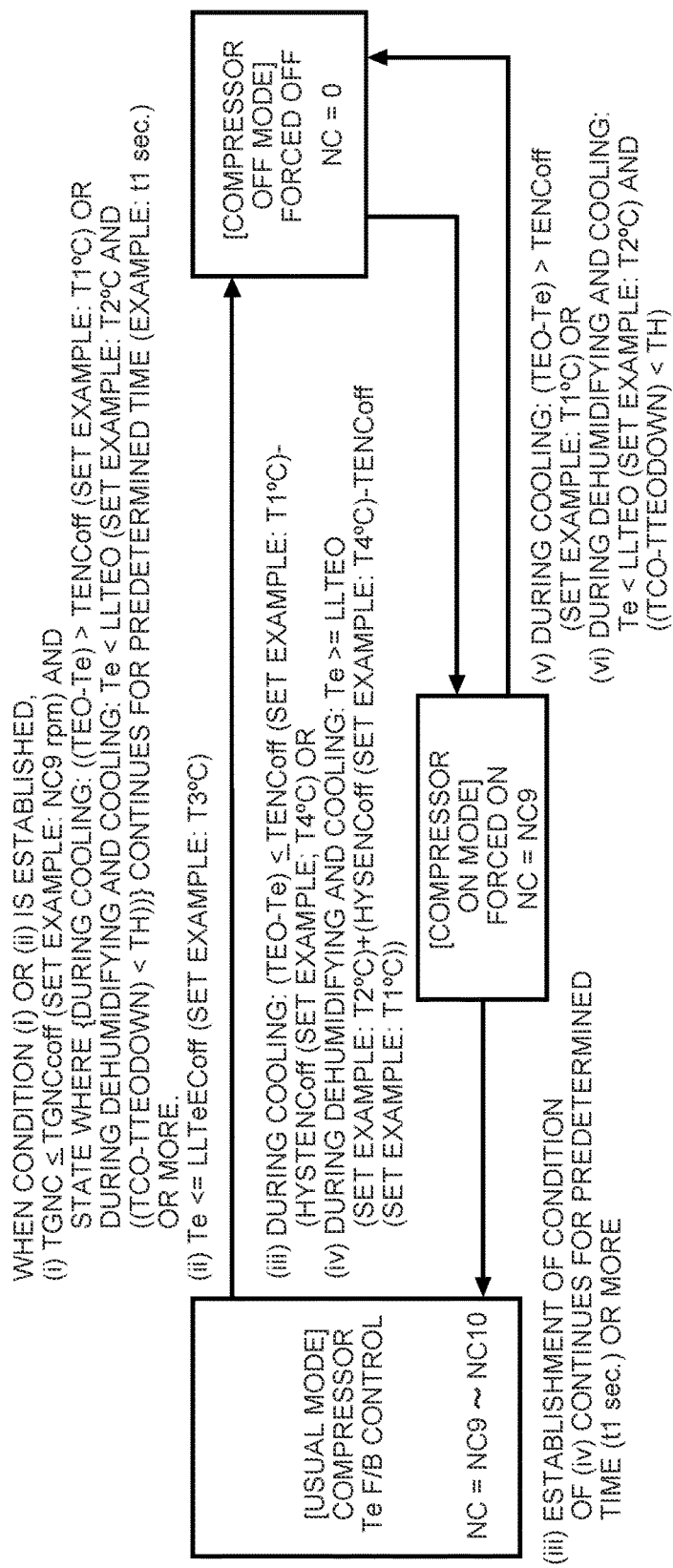
FIG. 19 is a diagram showing another example of control of a compressor during dehumidifying and cooling and a cooling mode (Embodiment 12)
Figure 20:
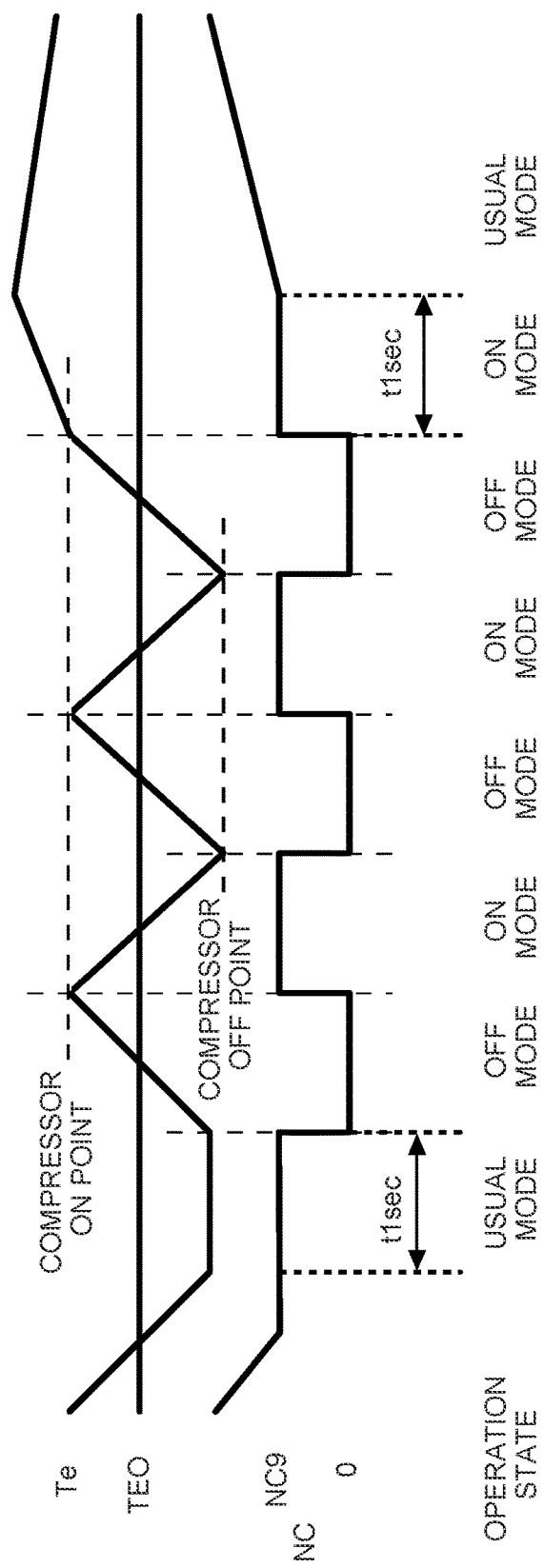
FIG. 20 is a timing chart showing an operation situation of the compressor in a case of FIG. 19.

Next, FIG. 19 and FIG. 20 show another example of control of a compressor 2 by a controller 32 in a cooling mode and a dehumidifying and cooling mode. In this embodiment, the controller 32 executes respective modes of a usual mode, a compressor OFF mode and a compressor ON mode in the cooling mode and the dehumidifying and cooling mode. In the usual mode, on the basis of a heat absorber temperature Te and a heat absorber target temperature TEO, the controller controls a number of revolution NC of the compressor 2 in a range of, for example, NC9 rpm to NC10 rpm by feedback control.

In such a usual mode, in a case where a condition (i) or (ii) mentioned below is established, the controller shifts to the compressor OFF mode (forced OFF).

(i) A target number of revolution TGNC is not more than a lower limit of controlling TGNCcoff (e.g., NC9 rpm) of the number of revolution NC of the compressor 2 in the dehumidifying and cooling mode and a state where a condition (i-i) is established continues for predetermined time (e.g., t1 seconds) or more. It is to be noted that the condition (i-i) is that during cooling, (TEO−Te) is larger than a predetermined value TENCoff (e.g., T1° C.) ((TEO−Te)>TENCoff), or (during dehumidifying and cooling, Te is lower than a predetermined value LLTEO (e.g., T2° C.) (Te<LLTEO) and (a radiator target temperature TCO−a predetermined value TTEODOWN (e.g., T5° C.) is lower than a radiator temperature TH ((TCO−TTEODOWN)<TH).

(ii) A heat absorber temperature Te is not more than a predetermined value LLTeECoff (e.g., T3° C.) (Te LLTeECoff).

That is, when the heat absorber temperature Te is lower than the heat absorber target temperature TEO even in a state of decreasing the number of revolution NC to the lower limit of controlling TGNCcoff in the cooling mode and a state where the temperature is lower than TEO−TENCoff (T1° C.) continues for predetermined time, the controller 32 shifts to the compressor OFF mode to stop the compressor 2 (NC=0). Furthermore, during the dehumidifying and cooling, when there continues, for predetermined time, a state where the heat absorber temperature Te is lower than the predetermined value LLTEO and a difference between the radiator target temperature TCO and the radiator temperature TH is smaller than the predetermined value TTEODOWN, the controller 32 shifts to the compressor OFF mode and does not stop when satisfying the heat absorber temperature Te or the radiator temperature TH (the above is the condition (i)). Furthermore, when the heat absorber temperature Te is not more than the predetermined value LLTeECoff of T3° C. or the like, the controller forcibly stops the compressor 2 (forced OFF) to prevent frosting onto a heat absorber 9 (the condition (ii)).

Next, in the compressor OFF mode, in a case where a condition (iii) or (iv) mentioned below is established, the controller shifts to the compressor ON mode and adjusts a target number of revolution into NC9 rpm that is the lower limit of controlling, to operate (forced ON).

(iii) In the cooling mode, (TEO−Te) is not more than the predetermined value TENCoff−a hysteresis HYSTENCoff (e.g., T4° C.) ((TEO−Te)≤TENCoff−HYSTENCoff).

(iv) In the dehumidifying and cooling mode, Te is not less than the predetermined value LLTEO+the hysteresis HYSTENCoff−the predetermined value TENCoff (Te≥LLTEO+(HYSTENCoff−TENCoff)).

That is, in the compressor OFF mode of the cooling mode, in a case where the heat absorber temperature Te rises and is not less than TEO−(TENCoff−HYSTENCoff), the controller shifts to the compressor ON mode, and in the dehumidifying and cooling mode, in a case where the heat absorber temperature Te rises and is not less than the predetermined value LLTEO+(HYSTENCoff−TENCoff), the controller shifts to the compressor ON mode.

Furthermore, in the compressor ON mode, in a case where a condition (v) or (vi) mentioned below is established, the controller shifts to the compressor OFF mode to stop the compressor 2.

(v) In the cooling mode, (TEO−Te) is larger than the predetermined value TENCoff (TEO−Te)>TENCoff).

(vi) In the dehumidifying and cooling mode, the heat absorber temperature Te is lower than the predetermined value LLTEO and a difference between the radiator target temperature TCO and the predetermined value TTEODOWN is smaller than the radiator temperature TH (Te<LLTEO and ((TCO−TTEODOWN)<TH).

That is, in the cooling mode of the operation at the lower limit of controlling, in a case where the heat absorber temperature Te lowers and again lowers below TEO−TENCoff, the controller shifts to the compressor OFF mode, and in the dehumidifying and cooling mode, when the heat absorber temperature Te again lowers below the predetermined value LLTEO and the difference between the radiator target temperature TCO and the radiator temperature TH is again smaller than the predetermined value TTEODOWN, the controller shifts to the compressor OFF mode to stop the compressor 2.

It is to be noted that in the compressor ON mode, in a case where the above condition (iii) or (iv) is continuously established for predetermined time (e.g., t1 seconds), the controller returns to the usual mode. A timing chart of FIG. 20 shows the above-mentioned operation state of the compressor 2. In the drawing, a compressor ON point indicates the above conditions (iii) and (iv) and a compressor OFF point indicates the conditions (i), (ii), (v) and (vi).

In this way, in a case where the temperature of the heat absorber 9 or the radiator 4 cannot be controlled even when adjusting the number of revolution of the compressor 2 into the lower limit of controlling TGNCcoff, the controller forcibly stops the compressor 2 and afterward, the controller turns on the compressor 2 (operates the compressor at the lower limit of controlling) and turns off (stops) the compressor until the compressor recovers. Therefore, controllability of the temperatures of the heat absorber 9 and the radiator 4 can improve and controllability of an outlet temperature to a vehicle interior can also improve.

Figure 21:
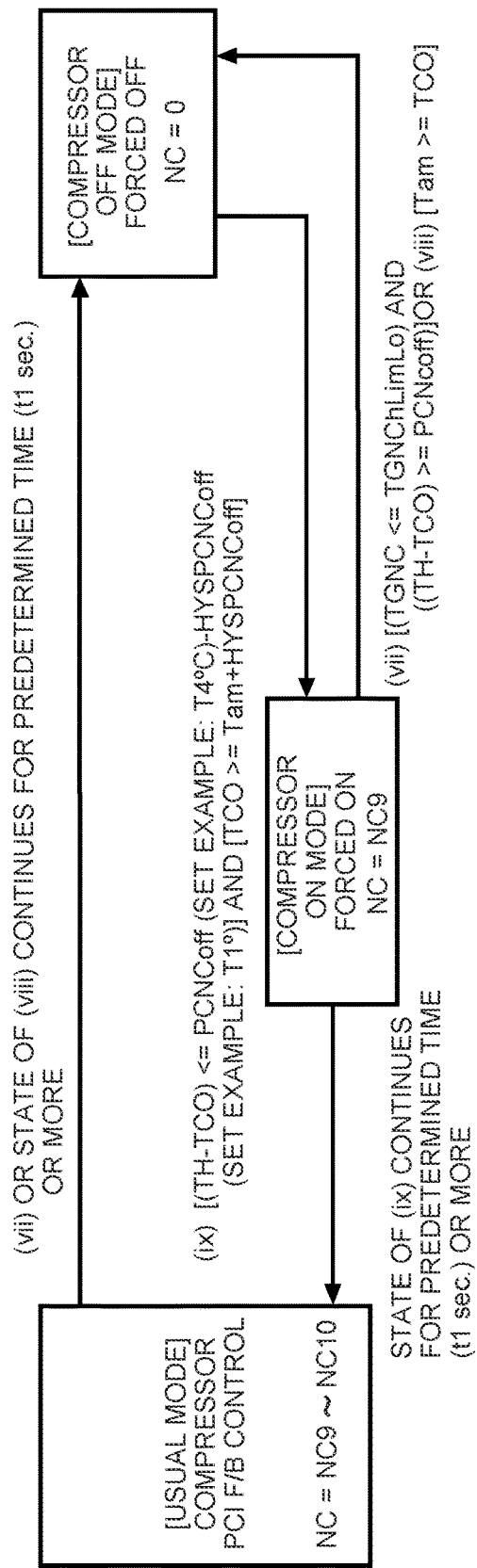
FIG. 21 is a diagram showing another embodiment of the control of the compressor in a heating mode.
Figure 22:
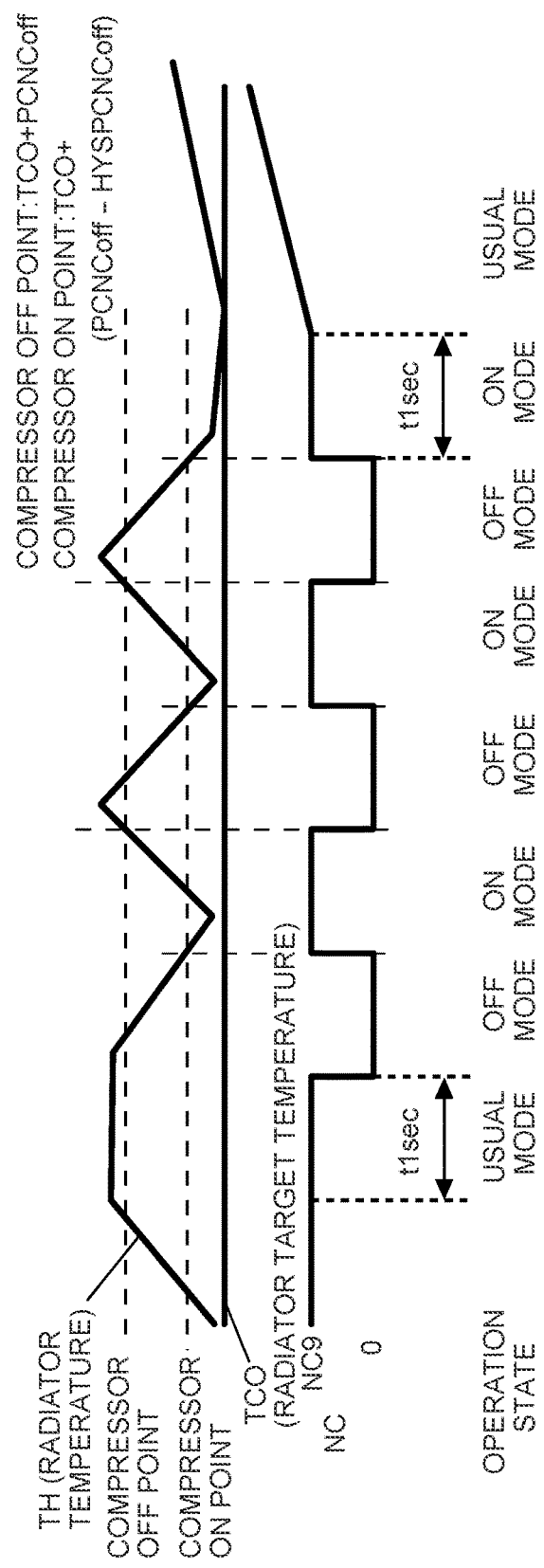
FIG. 22 is a timing chart showing an operation situation of the compressor in a case of FIG. 21.

Next, FIG. 21 and FIG. 22 show another embodiment of control of the compressor 2 by the controller 32 in a heating mode. In this embodiment, the controller 32 also executes respective modes of the usual mode, the compressor OFF mode and the compressor ON mode also in the heating mode. In the usual mode, on the basis of a radiator target pressure PCO and a radiator pressure PCI, the controller controls the number of revolution NC of the compressor 2 in a range of, for example, NC9 rpm to NC10 rpm by feedback control.

In such a usual mode, in a case where a condition (vii) or (viii) mentioned below is established to continue for predetermined time (e.g., t1 seconds) or more, the controller shifts to the compressor OFF mode (forced OFF).

(vii) The target number of revolution TGNC is not more than a lower limit of controlling TGNChLimLo (e.g., NC9 rpm) of the number of revolution NC of the compressor 2 in the heating mode, and (the radiator temperature TH−the TCO of a radiator target temperature sensor) is not less than a predetermined value PCNcoff (e.g., T4° C.) (TGNC≤TGNChLimLo) and (TH−TCO)≥PCNcoff).

(viii) An outdoor air temperature Tam is not less than the radiator target temperature TCO (Tam≥TCO).

That is, in the heating mode, when the radiator temperature TH rises in a state of decreasing the number of revolution NC to the lower limit of controlling TGNChLimLo and there continues for predetermined time a state where the temperature is not less than the radiator target temperature TCO+PCNcoff (T4° C.), the controller 32 shifts to the compressor OFF mode to stop the compressor 2 (NC=0) (the condition (vii)). Furthermore, when the outdoor air temperature Tam rises to be not less than the radiator target temperature TCO and this state continues for predetermined time, the controller 32 shifts to the compressor OFF mode and forcibly stops the compressor 2 (forced OFF) (the condition (viii)).

Next, in the compressor OFF mode, in a case where a condition (ix) mentioned below is established, the controller shifts to the compressor ON mode and adjusts the target number of revolution into NC9 rpm that is the lower limit of controlling, to operate (forced ON).

(ix) In the heating mode, (TH−TCO) is not more than the predetermined value PCNcoff−a hysteresis HYSPCNCoff (e.g., T1° C.) and TCO is not less than the outdoor air temperature Tam+the hysteresis HYSPCNCoff ((TH−TCO)≤(PCNCoff−HYSPCNCoff) and TCO≥(Tam+HYSPCNCoff)).

That is, in the compressor OFF mode of the heating mode, in a case where the radiator temperature TH lowers and is not more than TCO+PCNcoff−HYSPCNCoff or a case where the radiator target temperature TCO rises and is not less than the outdoor air temperature Tam+the hysteresis HYSPCNCoff, the controller shifts to the compressor ON mode.

Furthermore, in the compressor ON mode, when the above condition (vii) or (viii) is established, the controller shifts to the compressor OFF mode to stop the compressor 2.

That is, in the heating mode of the operation at the lower limit of controlling, when the radiator temperature TH rises and is not less than the radiator target temperature TCO+PCNCoff (T4° C.) (the condition (vii)) or when the outdoor air temperature Tam rises and is not less than the radiator target temperature TCO (the condition viii), the controller 32 shifts to the compressor OFF mode to forcibly stop the compressor 2 (forced OFF).

It is to be noted that in the compressor ON mode, in a case where the above condition (ix) is continuously established for predetermined time (e.g., t1 second), the controller returns to the usual mode. A timing chart of FIG. 22 shows the above-mentioned operation state of the compressor 2. A compressor ON point in the drawing is concerned with TH in the above condition (ix) and a compressor OFF point is concerned with TH in the condition (vii).

In this way, in a case where the temperature of the radiator 4 cannot be controlled even when adjusting the number of revolution of the compressor 2 into the lower limit of controlling TGNChLimLo, the controller forcibly stops the compressor 2, and afterward, the controller turns on (operates at the lower limit of controlling) the compressor 2 and turns off (stops) the compressor until the compressor recovers, so that the controllability of the temperature of the radiator 4 can improve and the controllability of the outlet temperature to the vehicle interior can improve.

Embodiment 13

(11-1) Constitution of Another Embodiment of Vehicle Air-Conditioning Device 1 (Embodiment 13)

Figure 23:
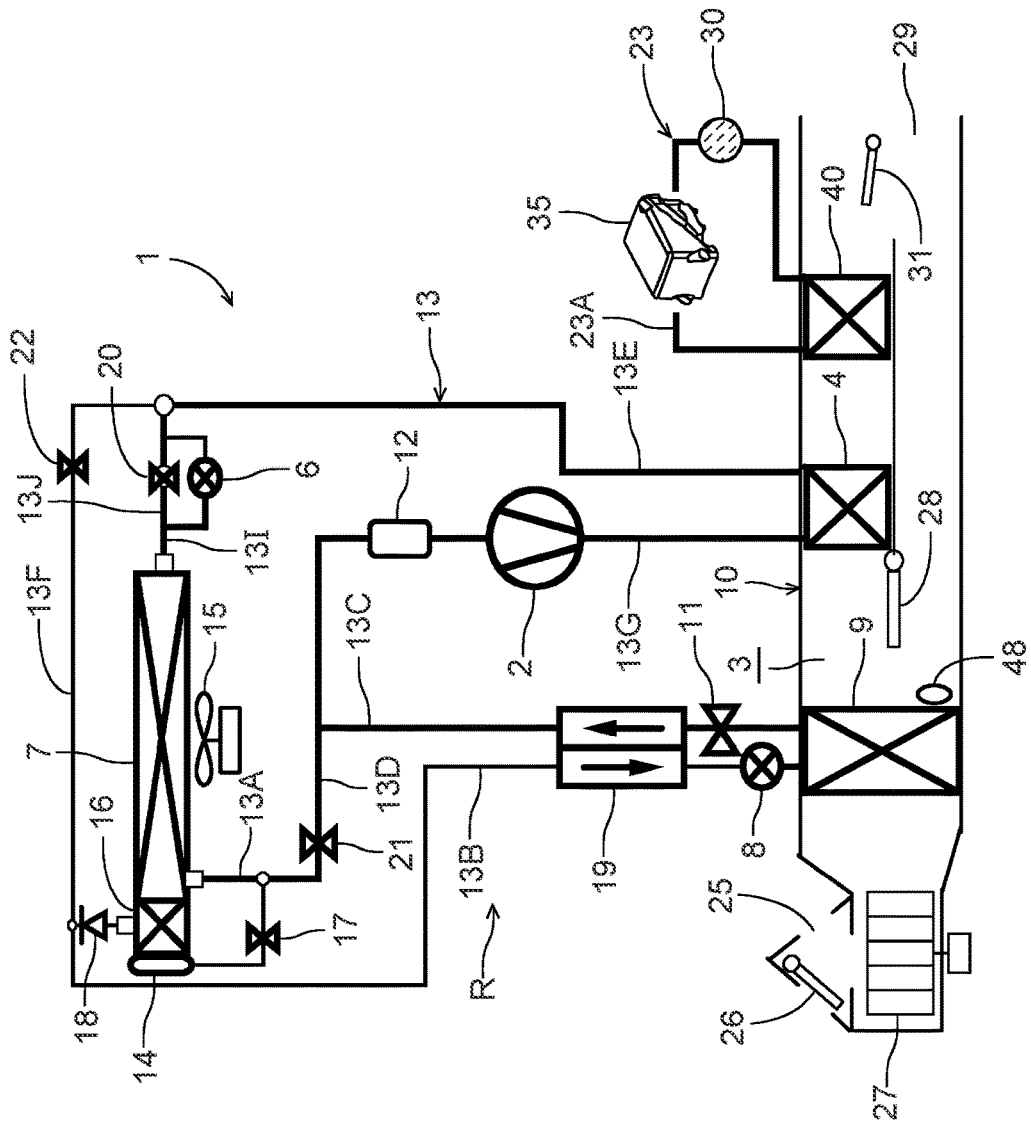
FIG. 23 is a constitutional view of another embodiment of a vehicle air-conditioning device to which the present invention is applied (Embodiment 13)

Next, FIG. 23 shows another constitutional view of the vehicle air-conditioning device 1 of the present invention. In this embodiment, a heating medium-air heat exchanger 40 of a heating medium circulating circuit 23 is disposed on an air downstream side of a radiator 4. Another constitution is similar to the example of FIG. 1. In this way, the present invention is also effective in the vehicle air-conditioning device 1 in which the heating medium-air heat exchanger 40 is disposed on a downstream side of the radiator 4.

Embodiment 14

(11-2) Constitution of Still Another Embodiment of Vehicle Air-Conditioning Device 1 (Embodiment 14)

Figure 24:
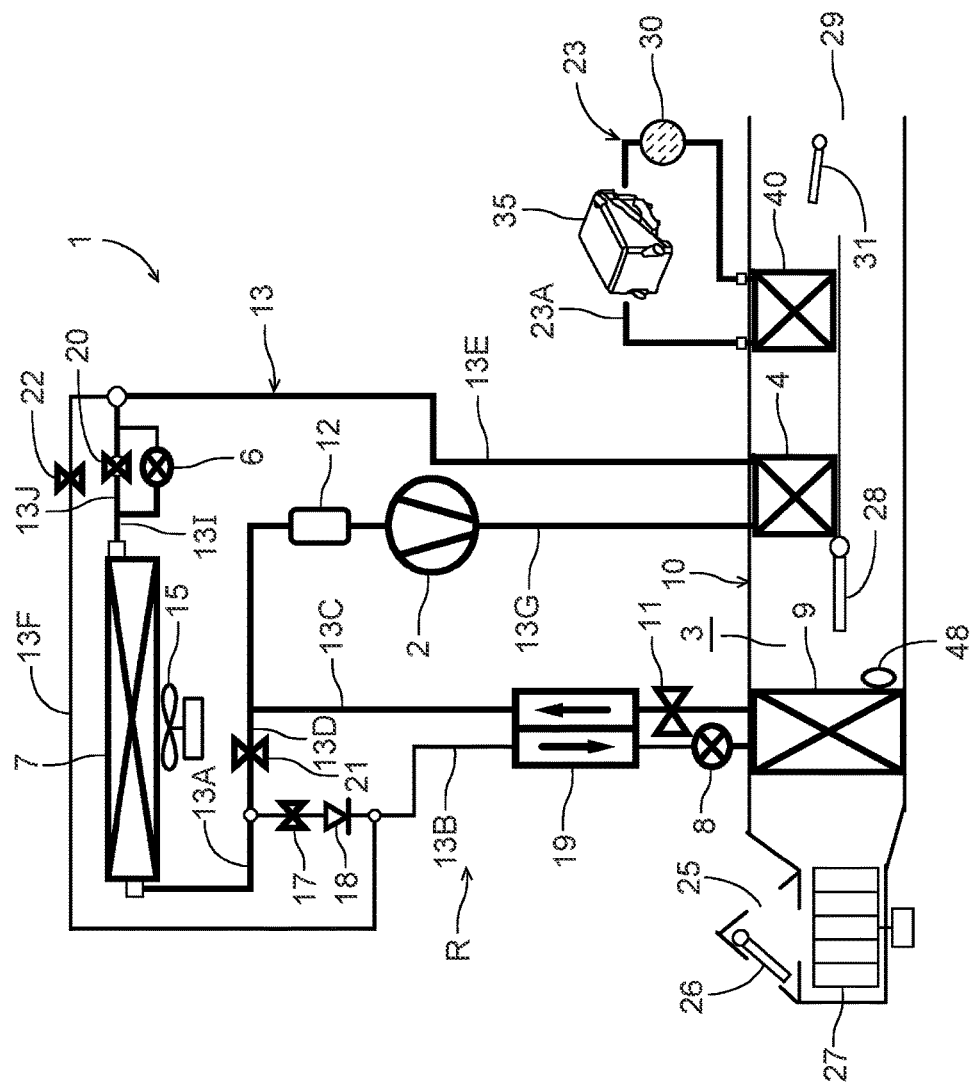
FIG. 24 is a constitutional view of still another embodiment of the vehicle air-conditioning device to which the present invention is applied (Embodiment 14)

Next, FIG. 24 shows still another constitutional view of the vehicle air-conditioning device 1 of the present invention. In this embodiment, a receiver drier portion 14 and a subcooling portion 16 are not disposed in an outdoor heat exchanger 7, and a refrigerant pipe 13A extending out from the outdoor heat exchanger 7 is connected to a refrigerant pipe 13B via a solenoid valve 17 and a check valve 18. Furthermore, a refrigerant pipe 13D branching from the refrigerant pipe 13A is similarly connected to a refrigerant pipe 13C on a downstream side of an internal heat exchanger 19 via a solenoid valve 21.

Another constitution is similar to the example of FIG. 23. In this way, the present invention is also effective in the vehicle air-conditioning device 1 of a refrigerant circuit R employing the outdoor heat exchanger 7 which does not have the receiver drier portion 14 and the subcooling portion 16.

Embodiment 15

(11-3) Constitution of Further Embodiment of Vehicle Air-Conditioning Device 1 (Embodiment 15)

Figure 25:
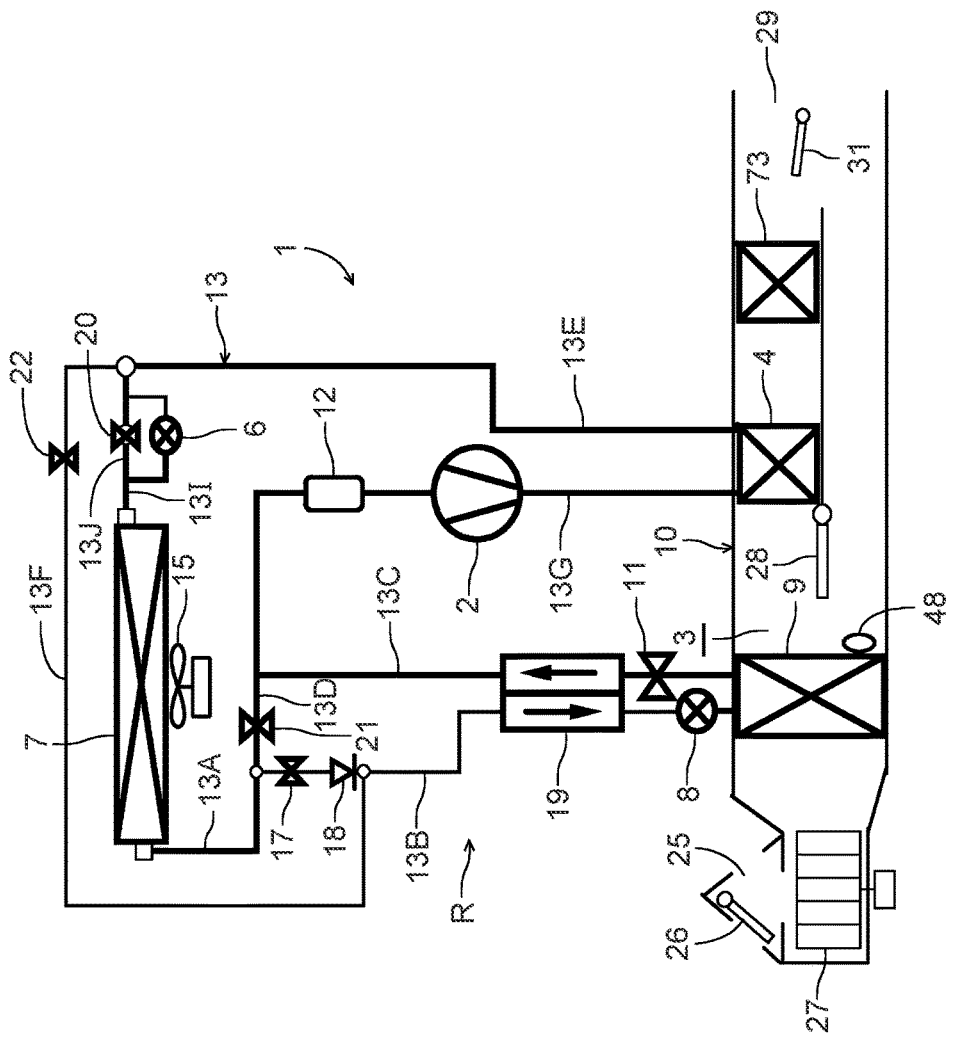
FIG. 25 is a constitutional view of a further embodiment of the vehicle air-conditioning device to which the present invention is applied (Embodiment 15)

Next, FIG. 25 shows a further constitutional view of the vehicle air-conditioning device 1 of the present invention. In this case, the heating medium circulating circuit 23 of FIG. 24 is replaced with an electric heater 73. In the above-mentioned case of the heating medium circulating circuit 23, the heating medium heating electric heater 35 is disposed outside a vehicle interior and outside an air flow passage 3, and hence electric safety is acquired, but a constitution is complicated.

On the other hand, when the electric heater 73 is disposed in the air flow passage 3 as shown in FIG. 25, the constitution is remarkably simplified. In this case, the electric heater 73 becomes auxiliary heating means, and a controller 32 executes the above-mentioned control. Further, the present invention is also effective in the vehicle air-conditioning device 1 of a refrigerant circuit R employing the electric heater 73.

Embodiment 16

(11-4) Constitution of Further Embodiment of Vehicle Air-Conditioning Device 1 (Embodiment 16)

Figure 26:
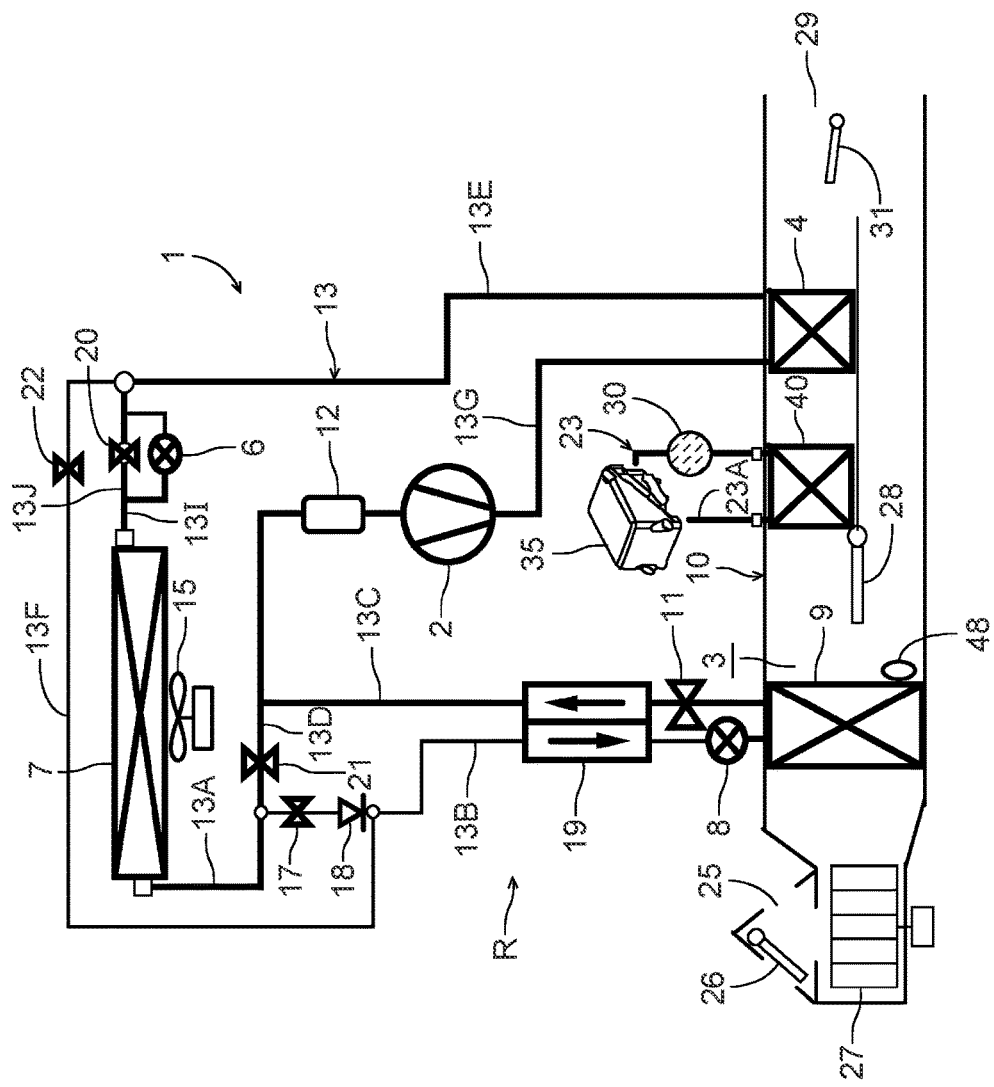
FIG. 26 is a constitutional view of a further embodiment of the vehicle air-conditioning device to which the present invention is applied (Embodiment 16)

Next, FIG. 26 shows a further constitutional view of a vehicle air-conditioning device 1 of the present invention. In this embodiment, as compared with FIG. 1, a receiver drier portion 14 and a subcooling portion 16 are not provided in an outdoor heat exchanger 7, and a refrigerant pipe 13A extending out from the outdoor heat exchanger 7 is connected to a refrigerant pipe 13B via a solenoid valve 17 and a check valve 18. Furthermore, a refrigerant pipe 13D branching from the refrigerant pipe 13A is similarly connected to a refrigerant pipe 13C on a downstream side of an internal heat exchanger 19 via a solenoid valve 21.

The other constitution is similar to the example of FIG. 1. The present invention is also effective in the vehicle air-conditioning device 1 of a refrigerant circuit R employing the outdoor heat exchanger 7 which does not have the receiver drier portion 14 and the subcooling portion 16 in this way.

Embodiment 17

(11-5) Constitution of Still Further Embodiment of Vehicle Air-Conditioning Device 1 (Embodiment 17)

Figure 27:
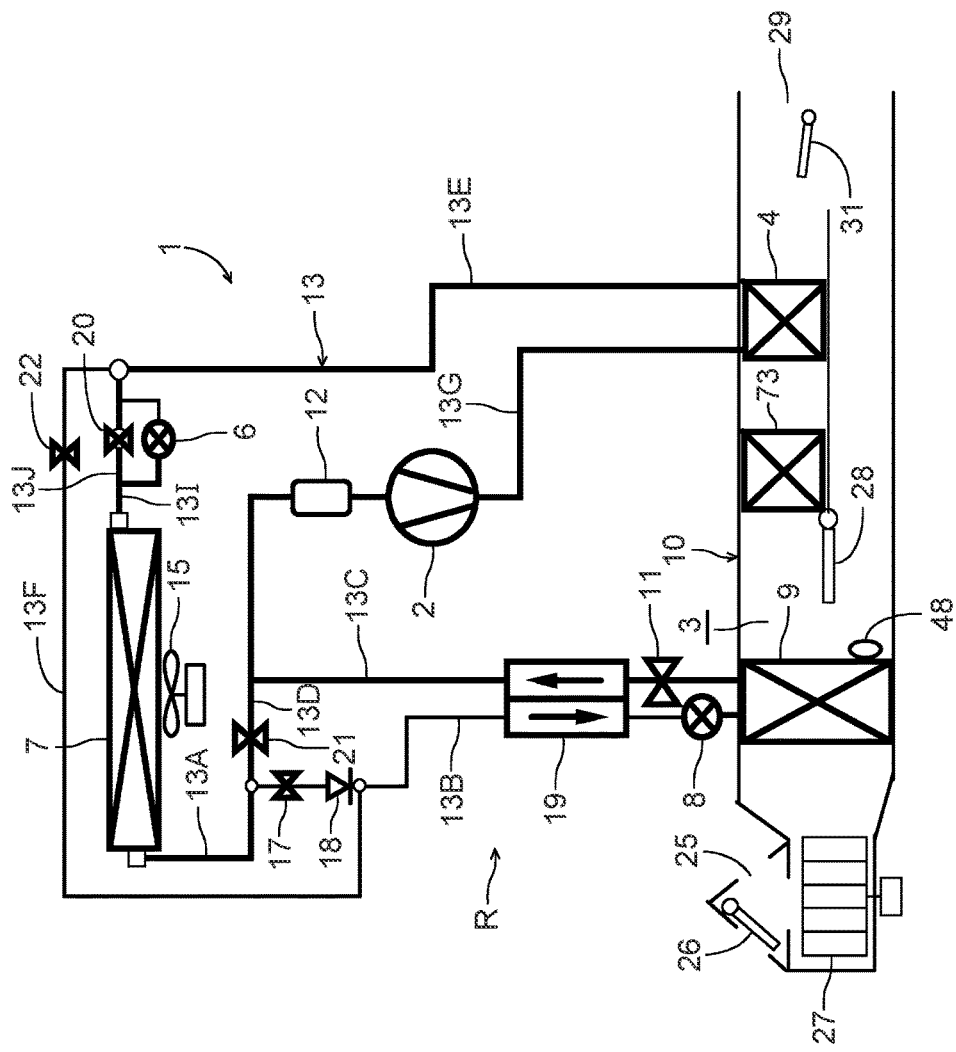
FIG. 27 is a constitutional view of a still further embodiment of the vehicle air-conditioning device to which the present invention is applied (Embodiment 17).

Next, FIG. 27 shows a still further constitutional view of the vehicle air-conditioning device 1 of the present invention. In this case, the heating medium circulating circuit 23 of FIG. 26 is replaced with an electric heater 73. The present invention is also effective in the vehicle air-conditioning device 1 of a refrigerant circuit R employing the electric heater 73.

It is to be noted that in the embodiments, the present invention is applied to the vehicle air-conditioning device 1 which changes and executes the respective operation modes of the heating mode, the dehumidifying and heating mode, the internal cycle mode, the dehumidifying and cooling mode and the cooling mode, but the present invention is not limited to these embodiments, and is also effective for a vehicle air-conditioning device which only performs the heating mode.

Furthermore, needless to say, the constitution and respective numeric values of the refrigerant circuit R described in the above respective embodiments are not limited to the embodiments, and are changeable without departing from the gist of the present invention.

DESCRIPTION OF REFERENCE NUMERALS 1 vehicle air-conditioning device
2 compressor
3 air flow passage
4 radiator
6 outdoor expansion valve
7 outdoor heat exchanger
8 indoor expansion valve
9 heat absorber
11 evaporation capability control valve
15 outdoor blower
17, 20, 21 and 22 solenoid valve
23 heating medium circulating circuit (auxiliary heating means)
26 suction changing damper
27 indoor blower
28 air mix damper
32 controller (control means)
35 heating medium heating electric heater
40 heating medium-air heat exchanger
73 electric heater
R refrigerant circuit

The invention claimed is:

1. A vehicle air-conditioning device comprising:
a compressor which compresses a refrigerant;
an air flow passage through which air to be supplied to a vehicle interior flows;
a radiator which lets the refrigerant radiate heat to heat the air to be supplied from the air flow passage to the vehicle interior;
a heat absorber which lets the refrigerant absorb heat to cool the air to be supplied from the air flow passage to the vehicle interior;
an outdoor heat exchanger disposed outside the vehicle interior to let the refrigerant absorb heat;
an outdoor expansion valve which decompresses the refrigerant flowing into this outdoor heat exchanger;
auxiliary heating means for heating the air to be supplied from the air flow passage to the vehicle interior; and
control means,
the vehicle air-conditioning device executing at least a heating mode in which the control means lets the refrigerant discharged from the compressor radiate heat in the radiator, decompresses the refrigerant by which heat has been radiated by the outdoor expansion valve, and then lets the refrigerant absorb heat in the outdoor heat exchanger, and in the heating mode, the vehicle air-conditioning device controlling a refrigerant subcool degree SC of the radiator by the outdoor expansion valve, wherein on the basis of a radiator inlet air temperature THin that is a temperature of the air flowing into the radiator, the control means corrects a minimum valve position of the outdoor expansion valve in a lowering direction, as the radiator inlet air temperature THin rises.

* * * * *